United States Patent
Heinecke et al.

(10) Patent No.: US 12,524,239 B2
(45) Date of Patent: Jan. 13, 2026

(54) SYSTEMS AND METHODS FOR PERFORMING 8-BIT FLOATING-POINT VECTOR DOT PRODUCT INSTRUCTIONS

(71) Applicant: Intel Corporation, Santa Clara, CA (US)

(72) Inventors: Alexander Heinecke, San Jose, CA (US); Menachem Adelman, Modi'in (IL); Evangelos Georganas, San Jose, CA (US); Amit Gradstein, Binyamina (IL); Christopher Hughes, Santa Clara, CA (US); Naveen Mellempudi, Bangalore (IN); Simon Rubanovich, Haifa (IL); Uri Sherman, Bustan Hagalil (IL); Zeev Sperber, Zikhron Yaakov (IL)

(73) Assignee: Intel Corporation, Santa Clara, CA (US)

( * ) Notice: Subject to any disclaimer, the term of this patent is extended or adjusted under 35 U.S.C. 154(b) by 576 days.

(21) Appl. No.: 17/958,377

(22) Filed: Oct. 1, 2022

(65) Prior Publication Data

US 2024/0045689 A1 Feb. 8, 2024

(51) Int. Cl.
*G06F 9/30* (2018.01)
*G06F 7/487* (2006.01)
(Continued)

(52) U.S. Cl.
CPC .......... *G06F 9/3016* (2013.01); *G06F 7/4876* (2013.01); *G06F 9/3001* (2013.01);
(Continued)

(58) Field of Classification Search
None
See application file for complete search history.

(56) References Cited

U.S. PATENT DOCUMENTS

2014/0032881 A1* 1/2014 Zohar .................. G06F 9/3001
                                                           712/207
2018/0307488 A1* 10/2018 Burgess ............. G06F 9/30036
(Continued)

FOREIGN PATENT DOCUMENTS

WO   WO-2020257531 A1 * 12/2020   ............. G06N 3/065

OTHER PUBLICATIONS

Chhajed, H. et al., BitMAC: Bit Serial Computation-Based Efficient Multiply-Accumulate Unit for DNN Accelerator, Jan. 2022, Birkhouser, pp. 2045-2060. (Year: 2022).*

*Primary Examiner* — Eric Coleman
(74) *Attorney, Agent, or Firm* — Nicholson De Vos Webster & Elliott LLP

(57) ABSTRACT

Disclosed embodiments relate to systems and methods for performing 8-bit floating-point vector dot product instructions. In one example, a processor includes fetch circuitry to fetch an instruction having fields to specify an opcode and locations of first source, second source, and destination vectors, the opcode to indicate execution circuitry is to multiply pairs of 8-bit floating-point formatted elements of the specified first and second sources, and accumulate the resulting products with previous contents of a corresponding single-precision element of the specified destination, decode circuitry to decode the fetched instruction, and execution circuitry to respond to the decoded instruction as specified by the opcode.

20 Claims, 17 Drawing Sheets

FP32 FORMAT
101

FP16 FORMAT
103

BF16 FORMAT
105

BF8 FORMAT
107

HF8 FORMAT
109

(51) Int. Cl.
*G06F 9/38* (2018.01)
*G06F 17/16* (2006.01)

(52) U.S. Cl.
CPC .......... *G06F 9/3013* (2013.01); *G06F 9/3802* (2013.01); *G06F 17/16* (2013.01)

(56) References Cited

U.S. PATENT DOCUMENTS

| | | | |
|---|---|---|---|
| 2021/0117194 A1* | 4/2021 | Heinecke | G06F 9/3802 |
| 2021/0124579 A1* | 4/2021 | Kaul | G06F 9/3851 |
| 2021/0286620 A1* | 9/2021 | Heinecke | G06F 9/30038 |
| 2023/0110316 A1* | 4/2023 | Pardo | G06F 9/30036 |
| | | | 712/220 |
| 2023/0297421 A1* | 9/2023 | Cowperthwaite | G06F 9/5055 |
| | | | 718/102 |

\* cited by examiner

FETCH AN INSTRUCTION HAVING FIELDS FOR AN OPCODE, AN IDENTIFICATION OF A LOCATION OF A FIRST PACKED DATA SOURCE OPERAND, AN IDENTIFICATION OF A LOCATION OF A SECOND PACKED DATA SOURCE OPERAND, AND AN IDENTIFICATION OF A PACKED DATA DESTINATION OPERAND, WHEREIN THE OPCODE IS TO INDICATE THAT EXECUTION CIRCUITRY IS TO PERFORM, FOR EACH DATA ELEMENT POSITION OF THE PACKED DATA SOURCE OPERANDS, A MULTIPLY OF N PAIRS OF 8-BIT FLOATING-POINT ELEMENTS OF THE SPECIFIED FIRST AND SECOND SOURCES, AND ACCUMULATE THE RESULTING PRODUCTS WITH CONTENTS OF A SINGLE-PRECISION DATA ELEMENT OF A CORRESPONDING DATA ELEMENT POSITION OF THE DESTINATION 301

TRANSLATE THE FETCHED INSTRUCTION INTO ONE OR MORE INSTRUCTIONS 303

DECODE THE INSTRUCTION (OR THE TRANSLATED ONE OR MORE INSTRUCTIONS) 305

RETRIEVE DATA ASSOCIATED WITH THE SOURCE OPERAND(S) AND SCHEDULE 307

EXECUTE THE DECODED INSTRUCTION(S) TO PERFORM, FOR EACH DATA ELEMENT POSITION OF THE PACKED DATA SOURCE OPERANDS, A MULTIPLY OF N PAIRS OF 8-BIT FLOATING-POINT ELEMENTS OF THE SPECIFIED FIRST AND SECOND SOURCES, AND ACCUMULATE THE RESULTING PRODUCTS WITH CONTENTS OF A SINGLE-PRECISION DATA ELEMENT OF A CORRESPONDING DATA ELEMENT POSITION OF THE DESTINATION 309

COMMIT A RESULT OF THE EXECUTED INSTRUCTION(S) 311

FIG. 3

```
VDP[X][B,H,BH,HB]F8S  SRCDEST, SRC1, SRC2
        VL = (128,256,512)
        KL = VL/32
        ORIGDEST := SRCDEST
        FOR I := 0 TO KL-1:
                IF K1[I] OR *NO WRITEMASK*:
                        IF SRC2 IS MEMORY AND EVEX.B == 1:
                                T := SRC2.DWORD[0]
                        ELSE:
                                T := SRC2.DWORD[I]

// FP32 FMA WITH DAZ IN, FTZ OUT AND RNE ROUNDING.
                        // MXCSR NEITHER CONSULTED NOR UPDATED.

SRCDEST.FP32[I] += CONVERT_FP8_TO_FP32(SRC1.FP8[2*I+0]) *
                                            CONVERT_FP8_TO_FP32(T.FP8[0])
                        SRCDEST.FP32[I] += CONVERT_FP8_TO_FP32(SRC1.FP8[2*I+1]) *
                                            CONVERT_FP8_TO_FP32(T. FP8 [1])
                        SRCDEST.FP32[I] += CONVERT_FP8_TO_FP32(SRC1.FP8[2*I+2]) *
                                            CONVERT_FP8_TO_FP32(T.FP8[2])
                        SRCDEST.FP32[I] += CONVERT_FP8_TO_FP32(SRC1.FP8[2*I+3]) *
                                            CONVERT_FP8_TO_FP32(T. FP8 [3])
                ELSE IF *ZEROING*:
                        SRCDEST.DWORD[I] := 0

ELSE: // MERGE MASKING, DEST ELEMENT UNCHANGED
                        SRCDEST.DWORD[I] := ORIGDEST.DWORD[I]

SRCDEST[MAX_VL-1:VL] := 0
```

FIG. 4

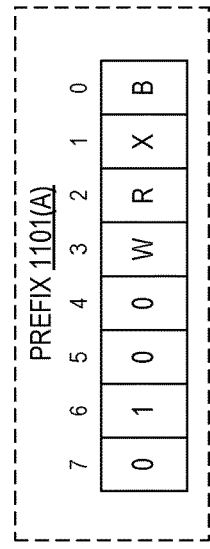
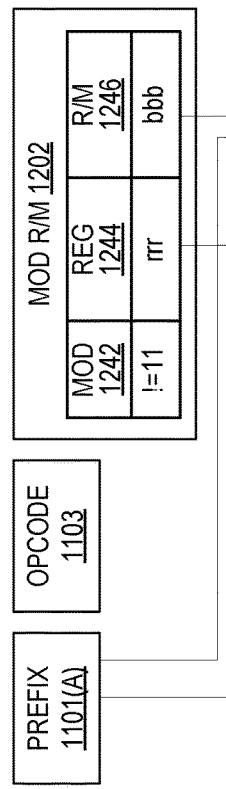
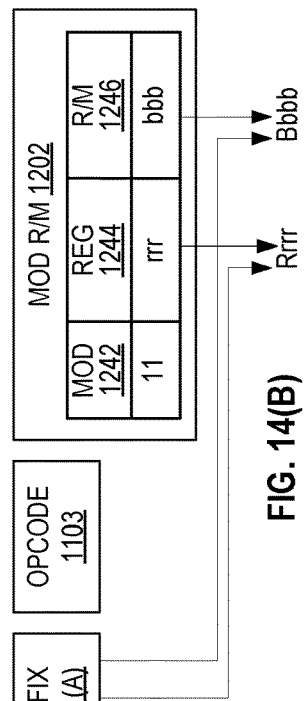
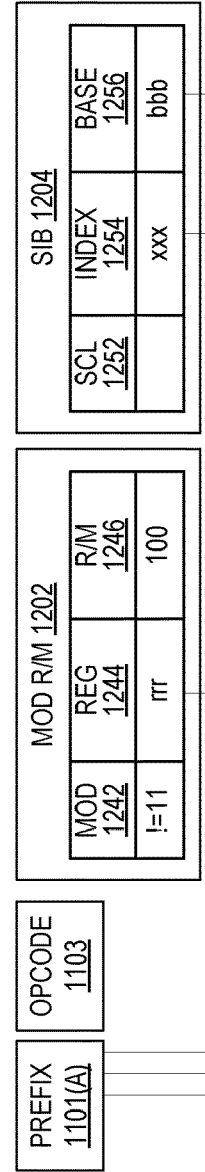
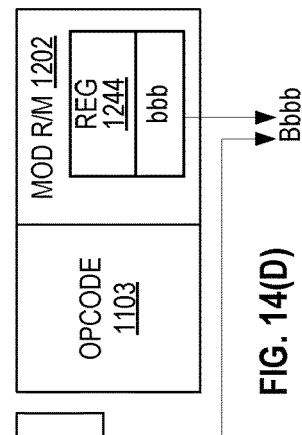
FIG. 13
FIG. 14(A)
FIG. 14(B)
FIG. 14(C)
FIG. 14(D)

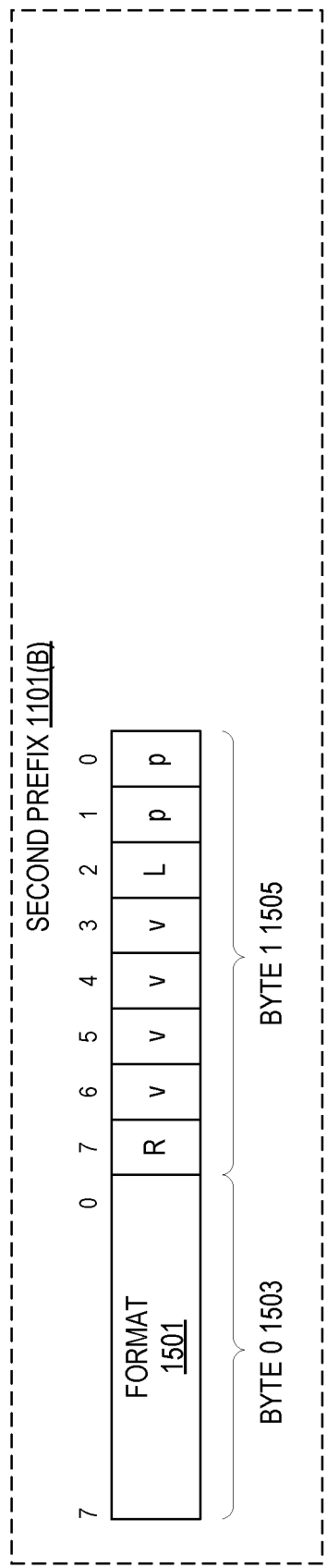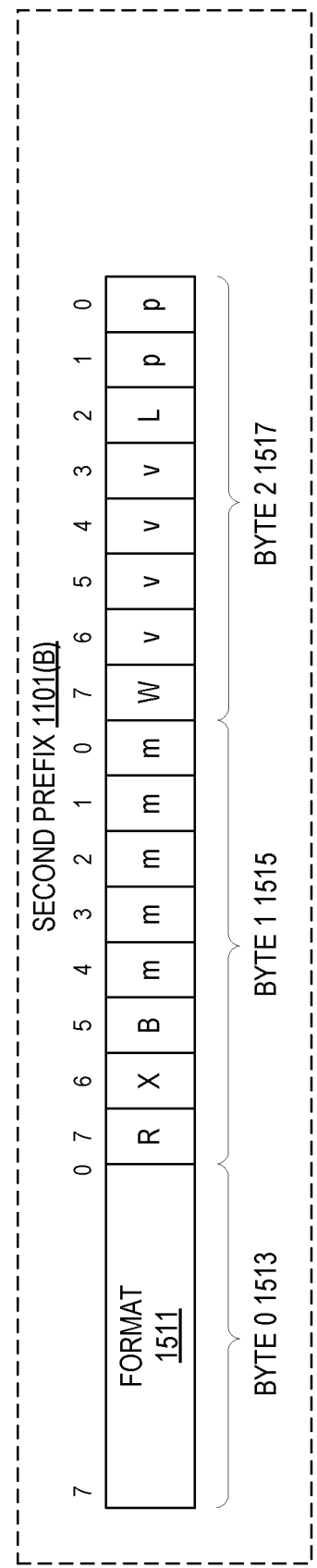

SYSTEMS AND METHODS FOR PERFORMING 8-BIT FLOATING-POINT VECTOR DOT PRODUCT INSTRUCTIONS

FIELD OF THE INVENTION

The field of invention relates generally to computer processor architecture, and, more specifically, to systems and methods for performing 8-bit floating-point vector dot product instructions.

BACKGROUND

An instruction set, or instruction set architecture (ISA), is the part of the computer architecture related to programming, and may include the native data types, instructions, register architecture, addressing modes, memory architecture, interrupt and exception handling, and external input and output (I/O). An instruction set includes one or more instruction formats. A given instruction format defines various fields (number of bits, location of bits) to specify, among other things, the operation to be performed and the operand (s) on which that operation is to be performed. A given instruction is expressed using a given instruction format and specifies the operation and the operands. An instruction stream is a specific sequence of instructions, where each instruction in the sequence is an occurrence of an instruction in an instruction format.

Scientific, financial, auto-vectorized general purpose, RMS (recognition, mining, and synthesis)/visual and multimedia applications (e.g., 2D/3D graphics, image processing, video compression/decompression, voice recognition algorithms and audio manipulation) often require the same operation to be performed on a large number of data items (referred to as "data parallelism"). Single Instruction Multiple Data (SIMD) refers to a type of instruction that causes a processor to perform the same operation on multiple data items. SIMD technology is especially suited to processors that can logically divide the bits in a register into a number of fixed-sized data elements, each of which represents a separate value. For example, the bits in a 512-bit register may be specified as a source operand to be operated on as sixteen separate 32-bit single-precision floating-point data elements. As another example, the bits in a 256-bit register may be specified as a source operand to be operated on as sixteen separate 16-bit floating-point packed data elements, eight separate 32-bit packed data elements (double word size data elements), or thirty-two separate 8-bit data elements (byte (B) size data elements). This type of data is referred to as the packed data type or vector data type, and operands of this data type are referred to as packed data operands or vector operands. In other words, a packed data item or vector refers to a sequence of packed data elements; and a packed data operand or a vector operand is a source or destination operand of a SIMD instruction (also known as a packed data instruction or a vector instruction).

By way of example, one type of SIMD instruction specifies a single vector operation to be performed on two source vector operands in a vertical fashion to generate a destination vector operand of the same size, with the same number of data elements, and in the same data element order. The data elements in the source vector operands are referred to as source data elements, while the data elements in the destination vector operand are referred to a destination or result data elements. These source vector operands are of the same size and contain data elements of the same width, and thus they contain the same number of data elements. The source data elements in the same bit positions in the two source vector operands form pairs of data elements (also referred to as corresponding data elements; that is, the data element in data element position 0 of each source operand correspond, the data element in data element position 1 of each source operand correspond, and so on). The operation specified by that SIMD instruction is performed separately on each of these pairs of source data elements to generate a matching number of result data elements, and thus each pair of source data elements has a corresponding result data element. Since the operation is vertical and since the result vector operand is the same size, has the same number of data elements, and the result data elements are stored in the same data element order as the source vector operands, the result data elements are in the same bit positions of the result vector operand as their corresponding pair of source data elements in the source vector operands. In addition to this exemplary type of SIMD instruction, there are a variety of other types of SIMD instructions.

BRIEF DESCRIPTION OF THE DRAWINGS

FIG. 3 illustrates embodiments of method to process an instruction to perform a dot product operation using FP8 source data elements.

FIG. 4 illustrates examples of pseudocode representing the execution and format of an instruction to perform a dot product using FP8 values

FIG. 13 illustrates examples of a first prefix.

FIGS. 14(A)-(D) illustrate examples of how the R, X, and B fields of the first prefix in FIG. 13 are used.

FIGS. 15(A)-(B) illustrate examples of a second prefix.

DETAILED DESCRIPTION OF THE EMBODIMENTS

The present disclosure relates to methods, apparatus, systems, and non-transitory computer-readable storage media for performing a dot product operations using 8-bit floating point data in response to a single instruction.

Dot product multiplication of vectors containing FP8 elements is useful in a number of algorithms that perform the multiplication on 8-bit sources and accumulate the multiplication results with 32-bit destination vector elements. We propose a set of new vector packed instructions (VDP[X][B,H,BH,HB]F8S) that implements dot product multiplication of pairs of FP8 elements in two source vectors. The instruction takes two source vectors having two pairs of FP8 values per element (i.e., 32-bit source elements) and generates a destination vector having single-precision elements (i.e., also 32 bits, so source and destination registers are balanced). In some examples, the multiply output is 32-bits and is saturated and accumulated with doublewords in the destination register. In other examples, it is not saturated before accumulation.

There are no previously known instructions for performing dot product operations on vectors by multiplying 8-bit floating-point (e.g., FP8) elements of two source vectors and accumulating the results in a single-precision destination vector. Such instructions would have comparable quality (e.g., amount of time or cycles to converge in a training portion of a deep learning algorithm) as dot product operations performed on single-precision sources but would reduce memory utilization, and memory bandwidth requirements, which would serve to improve performance and power efficiency, especially in the machine learning context.

The instructions detailed herein implement multiply functionality on vector registers. Without the described VDP[X][B,H,BH,HB]F8S instruction, performing this functionality with existing instructions would require a sequence of instructions to perform multiply on the vector register, and accumulation with the destination doubleword data to generate the saturated or unsaturated results.

Figure 1:
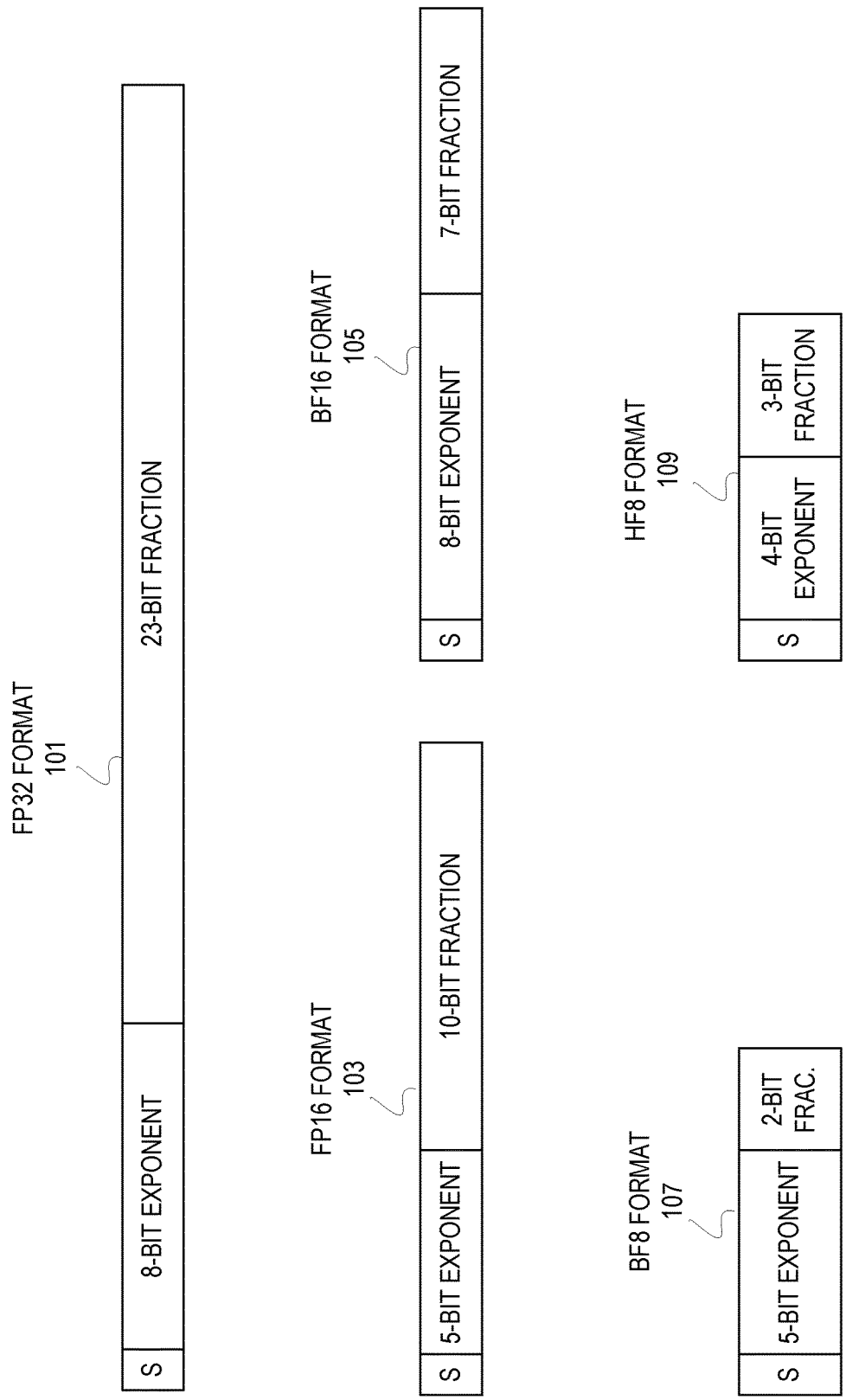
FIG. 1 illustrates different floating point representation formats.

FIG. 1 illustrates different floating point representation formats. In this illustration, the formats are in little endian format, however, in some embodiments, a big endian format is used. The FP32 format 101 has a sign bit (S), an 8-bit exponent, and a 23-bit fraction (a 24-bit mantissa that uses an implicit bit). The FP16 format 103 has a sign bit (S), a 5-bit exponent, and a 10-bit fraction. The BF16 format 105 has a sign bit (S), an 8-bit exponent, and a 7-bit fraction.

In contrast to the IEEE 754-standardized 16-bit (FP16) variant, BF16 does not compromise on range when being compared to FP32. FP32 numbers have 8 bits of exponent and 24 bits of mantissa (including the one implicit). BF16 cuts 16 bits from the 24-bit FP32 mantissa to create a 16-bit floating point datatype. In contrast FP16, roughly halves the FP32 mantissa to 10 explicit bits and reduces the exponent to 5 bits to fit the 16-bit datatype envelope.

Although BF16 offers less precision than FP16, it is typically better suited to support deep learning tasks. FP16's range is not enough to accomplish deep learning training out-of-the-box due to its limited range. BF16 does not suffer from this issue and the limited precision may actually help to generalize the learned weights in the neural net training task. In other words, lower precision can be seen as offering a built-in regularization property.

In some examples, an 8-bit floating point format (FP8) provides some advantages over a larger floating point format. For example, an 8-bit floating point format may reduce pressure on memory and bandwidth used for machine learning (such as weights, activations, and gradient values used for training and/or inference of neural networks). As shown, the IEEE and BF16 formats have a fixed number of bits allocated to the fraction (or mantissa which is the fraction bits+1 bit) and exponent fields. Additionally, in some examples, a fixed exponent bias may be provided for a FP16 or BF16 number. As eight bits allows for a small number of mantissa and exponent bits than FP16 or BF16 it may be advantageous to have some variance in FP8 formats (e.g., ensure high accuracy and convergence when training machine learning models).

In machine learning, different parameters, namely weights, gradients and activations, have different precision and range requirements to achieve high training accuracy and/or convergence. This allows for different allocations of the number of exponent and fraction (mantissa bits) depending on the parameter being represented.

An example FP8 format is shown in 107. In some examples, this is called a bfloat8-bit floating point (BF8) format. As shown, this format uses 1 bit for a sign, 5 bits for the exponent, and 2 bits for the fraction (or 1+2 bits for the mantissa). An example FP8 format is shown in 109. In some examples, this is called a hybrid8-bit floating point (HF8) format. As shown, this format uses 1 bit for a sign, 4 bits for the exponent, and 3 bits for the fraction (or 1+3 bits for the mantissa).

Normalized numbers, subnormal (denormal) numbers, and zeroes are supported in both FP8 formats. In some examples, infinity and not-a-number (NaN) encodings are not supported, however, in some examples one or more are. In examples where infinities are not supported, a maximum exponent value is not reserved for encoding NaN and +/−infinity and just used to represent normalized floating-point numbers.

In examples where infinities and NaN are supported, these are mapped to 0x80. In some examples, for a NaN on an overflow, the value may be upconverted to IEEE754 NaN. In some examples, infinities and NaN raise exceptions for a hardware status register to delineate NaN from overflow.

In some examples, a zero is represented by an encoding with all zeroes the exponent and the fraction. Encodings with an all zero exponent and non-zero fraction represent denormal numbers. In the HF8 format, an exponent=$0000_2$ and mantissa=$000_2$ represents numerical value of zero, while exponent=$0000_2$ and mantissa=$001_2$, $010_2$, $011_2$, $100_2$, $101_2$, $110_2$, and $111_2$ represent the denormal numbers. Similarly, in the BF8 format an exponent=$00000_2$ and mantissa=$00_2$ represents numerical value of zero, while exponent=$00000_2$ and mantissa=$01_2$, $10_2$, and $11_2$ represent the denormal numbers.

In some examples, the FP8 formats utilize a variable exponential bias (e.g., a 6-bit unsigned integer value used as a bias). A bias skews the range of representable values more on the smaller numeric values at the expense of larger numerical values. In these examples, a numerical value of a normalized floating point number is $(1)^{sign} \times 2^{exponent-bias} \times 1.\text{mantissa}$ and the numerical value of a denormal floating point number is $(1)^{sign} \times 2^{exponent-bias} \times 0.\text{mantissa}$. In some examples, the bias is provided by one or more packed data registers (e.g., SIMD or vector) where each data element position of the one or more packed data registers is to provides a bias value for a corresponding data element position of a source and/or destination. In some examples, the bias is provided by one or more general purpose registers where each general purpose register provides a bias to be used for each data element of a particular source and/or destination. Note that in some examples, a single general purpose register is used for a plurality of sources and/or destination. In some examples, the maximum bias is 16 for BF8 and 8 for HF8.

In some examples, not-a-number (NANs) and infinities are defined similarly to other IEEE floating points format, using an all-ones exponents. However, it is also acceptable in some examples to define versions of instructions that support other formats where "negative zero" is used to denote NANs and infinities, and the all-ones exponent is used to encode normal floating point numbers.

In some examples, hardware support for FP8 supports one or more status (condition code) flags: invalid, denormal, overflow, and underflow. An arithmetic operation with a denormal operand will set the denormal exception flag, while an arithmetic operation with any NaN operand or no useful definable result will set the invalid exception flag. An arithmetic operation with a result that that overflows or underflows a destination will set the overflow and underflow exception flags respectively in some examples.

Recent work has also shown that 8-bit float point formats, such as BF8 (using a 1-5-2 format (1-bit sign, 5-bit exponent, and 2-bit fraction or a 1-4-3 format), are a viable option for input data for mixed precision computation such as fused multiply-add (FMA) with BF8 inputs and a FP32 accumulator. To prepare higher-precision outputs to be used as the next operation's inputs, in some embodiments, those outputs need to be converted/rounded to FP8 numbers. Using 8-bit floating-point format instead of single-precision in at least some matrix operations is expected to alleviate memory utilization and bandwidth issues while providing a non-trivial performance upside (e.g., on the order of 2×) even during the compute operation. Additionally, numerical accuracy studies have shown that the precision of the Deep Learning application is not compromised. However, extensive workload studies have shown, that from time to time its required to avoid classic round-to-nearest behavior during these down converts. Instead, a stochastic rounding operation is needed. Examples herein relate to conversion using a provided bias term, including variable in-place, $2^{nd}$ source merging and/or saturating.

Current experiments show bandwidth issues on the various cache levels and DRAM. So, as matrix compute capabilities speed up significantly (2×), the memory sub-systems capabilities only increase modestly due to reduce memory footprint. However, it has been found important to achieve convergence that FMAs accumulate into single-precision, IEEE float32. That means it may be important down-convert a result to FP8 after the operation completes.

In some examples, BF8-based operations support round to nearest even (RNE) and stochastic rounding. In some examples, HF8-based operations support round to nearest even (RNE) and stochastic rounding. In some examples, hybrid operations using both HF8 and BF8 are supported.

Some CPUs only offer float16 compute and int8/int16 compute stacks. In order to convert a number from BF8/HF8 to IEEE Float 16/IEEE Float 32, especially when having a variable bias, requires a detour via various int8/int8 instructions and results in a (very) slow execution which depends on the flavor of FP8 number being used. This has even a bigger impact as we would pair these slow upconverts in practice with a at least twice as fast BF8 matrix multiplication unit than using IEEE float16/bfloat16. We therefore thrive for speeding up all upconvert variants to IEEE float16/float 32.

Detailed herein are examples of one or more instructions that for a 8-bit floating-point (e.g., FP8) dot product. Examples of a processor equipped to handle such instructions include fetch circuitry to fetch an instruction having fields to specify an opcode and locations of first source, second source, and destination vectors. The opcode is to cause the processor to multiply N pairs of 8-bit floating-point formatted elements of the specified first and second sources, and accumulate each of the resulting products with previous contents of a corresponding single-precision element of the specified destination. Such a processor would further include decode circuitry to decode the fetched instruction, and execution circuitry to respond to the decoded instruction as specified by the opcode.

In particular, examples include a dot product instruction, VDP[X][B,H,BH,HB]F8S for use on source vectors having two pairs of 8-bit floating point format (e.g., FP8) elements. This instruction gets two vector source operands, performs the dot product of elements of corresponding data element positions, and accumulates each result with previous contents of a corresponding single-precision destination element. The source and destination vectors can each be in vector registers, or in memory. The size of each vector can be any of 128 bits, 256 bits, and 512 bits.

In some examples, a FP8 source dot product instruction has a mnemonic of VDP[X][B,H,BH,HB]F8S where VDP indicates a vector dot product, and B, H, BH, and HB indicates the 1-5-2 version of FP8 or the 1-4-3 version of FP8. An embodiment of a format for the FP8 source dot product instruction is VDP[X][B,H,BH,HB]F8S {k1} DST, SRC. In some embodiments VDP[X][B,H,BH,HB]F8S is the opcode mnemonic of the instruction. DST indicates the packed data destination operand location and SRC indicates a packed data source operand location. Exemplary operand sizes include, but are not limited to 64-bit, 128-bit, 256-bit, 512-bit, and 1024-bit. Note that in some embodiments, VDP[X][B,H,BH,HB]F8S uses different size operands (for example, 512-bit source and 256-bit destination, or 256-bit source and 128-bit destination). The [X] indicates that a bias may be applied. The bias may be dynamic and provided by a second source such as a second register.

In some embodiments, k1 indicates the use of writemasking/predication. One or more of the operands may be a memory location. In some embodiments, the destination is encoded using one or more fields for ModRM:reg(w) and the source is encoded using one or more fields for ModRM:r/m(r). In some embodiments, the instruction uses prefix 1101(C).

In some examples, the destination (DST) is a field for the destination operand identifier, such as packed data register or memory. The source (SRC) is one or more fields for the source operands identifier, such as a packed data register and/or memory. In some examples, the opcode is provided by at least field 1103, DST field is provided by field 1244, the first source is provided by bits VVVV of one of 1505, BPJ17, or 1617, and the second source is provided by at least 1246. In some examples, the opcode is provided by at least field 1103, DST field is provided by at least field 1244, the first source is provided by bits VVVV of one of 1505, BPJ17, or 1617, and the second source is a memory location provided by at least 1246 and/or the SIB byte 1204. In some examples, a bias is provided by register or memory location (such as provided by at least 1246 and/or the SIB byte 1204).

Figure 2:
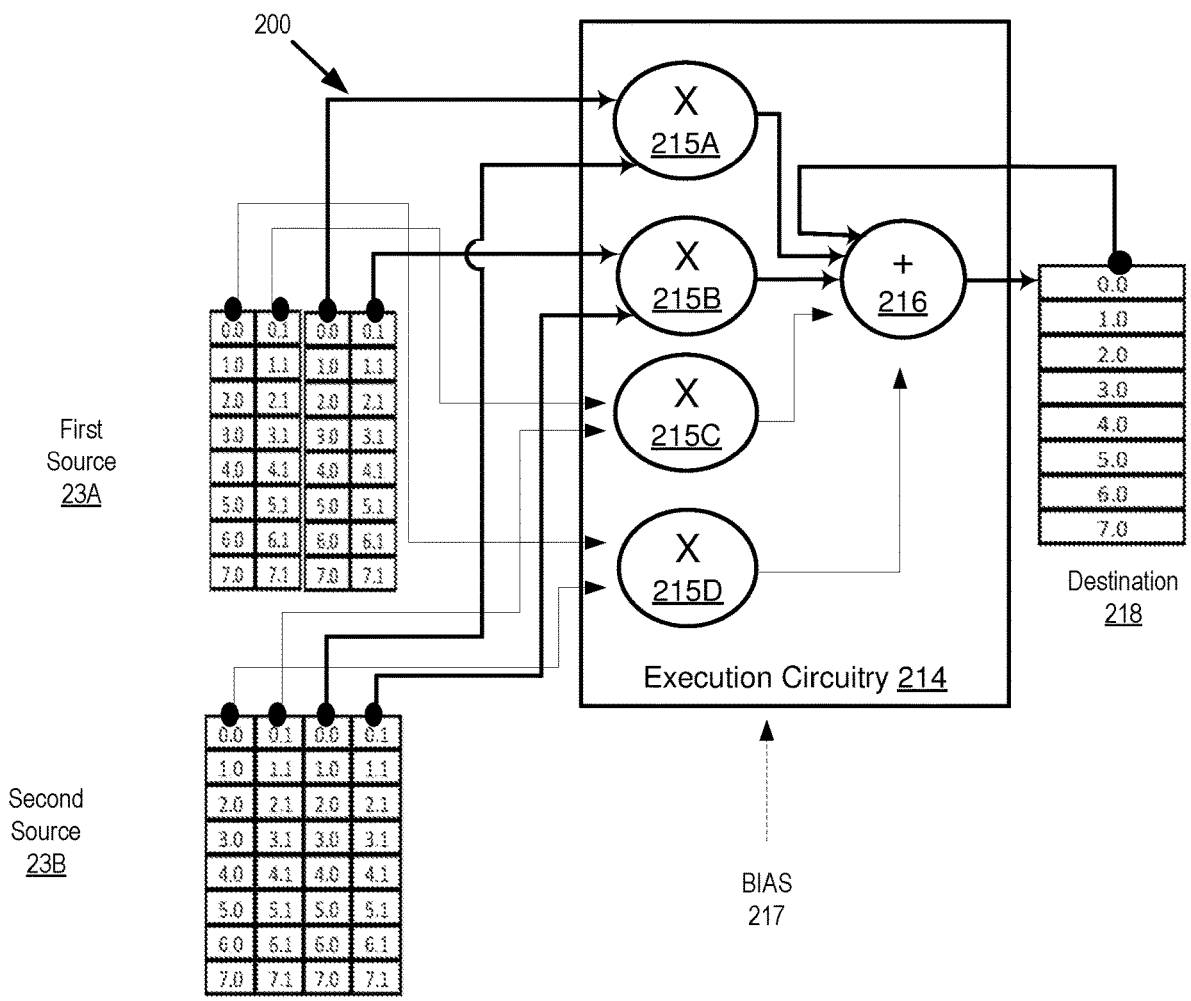
FIG. 2 is a block diagram illustrating execution of a VDP[X][B,H,BH,HB]F8S instruction, according to embodiments.

FIG. 2 is a block diagram illustrating execution of a VDP[X][B,H,BH,HB]F8S instruction, according to embodiments. As shown, computing apparatus 200 (e.g., aspects of a processor or core) is to receive, fetch, and decode (fetch and decode circuitry not shown here, but are illustrated and described at least with respect to other figures) a VDP[X][B,H,BH,HB]F8S instruction 201, which includes fields to specify opcode 202 (VDP[X][B,H,BH,HB]F8S) and locations of destination 204, first source 206, and second source 208 vectors. Also shown are specified first and second source vectors 212A and 212B, execution circuitry 214, which includes multipliers 215A, 215B and accumulator 216, and specified destination vector 218. In some examples, a bias 217 is also used during a conversion from FP8 to FP32.

In operation, computing apparatus 200 (e.g., a processor), is to fetch and decode, using fetch and decode circuitry (not shown), instruction 201 having fields to specify opcode 202 and locations of first source 206, second source 208, and destination 204 vectors, the opcode to indicate the computing apparatus (e.g., processor) is to multiply N pairs of 8-bit floating-point elements of the specified first and second sources, and accumulate the resulting products with previous contents of a corresponding single-precision (e.g., FP32) element of the specified destination. In some examples, the 8-bit floating point elements are of different formats.

In some examples, FP8 values are upconverted by the multiplication circuitries 215A and 215B. In some examples, a (variable or static) bias 1405 is applied during the upconversion. In some examples, the upconversion is to FP32.

Execution circuitry 214 is to respond to the decoded instruction as specified by opcode 202. In some embodiments, execution circuitry 214 performs saturation, as needed, on the results of multipliers 215A and 215B, and accumulator 216. In some embodiments, execution circuitry performs the multiplications with infinite precision without saturation and saturates the results of the accumulation to plus or minus infinity in case of an overflow and to zero in case of any underflow. In some embodiments, execution circuitry 214 is to generate all N destination elements in parallel.

FIG. 3 illustrates embodiments of method to process an instruction to perform a dot product operation using FP8 source data elements. For example, a processor core as shown herein, a pipeline as detailed below, etc. performs aspects of this method.

At 301 an instruction is fetched having fields for an opcode, an identification of a location of a first packed data source operand, an identification of a location of a second packed data source operand, and an identification of a packed data destination operand, wherein the opcode is to indicate that execution circuitry is to multiply pairs of 8-bit floating-point elements of the specified first and second sources, and accumulate the resulting products with contents of a corresponding single-precision destination element. In some examples, the FP8 data elements are of different types per source.

In some embodiments, the fetched instruction, of a first ISA, is translated into one or more instructions of a second, different ISA at 303. The one or more instructions of the second, different ISA, when executed, provided the same result as if the fetched instruction had been executed. Note the translation may be performed by hardware, software, or a combination thereof.

The instruction (or the translated one or more instructions) is/are decoded 305. This decoding may cause the generation of one or more micro-operations to be performed. Note that as this instruction Data values associated with the source operand of the decoded instruction are retrieved at 307. For example, when a source operand is stored in memory, the data from the indicated memory location is retrieved.

At 309, the decoded instruction(s) is/are executed by execution circuitry (hardware) such as that detailed herein. The execution circuitry is to perform, for each data element position of the packed data source operands a multiply pairs of 8-bit floating-point elements of the specified first and second sources, and accumulate the resulting products with contents of a single-precision data element of a corresponding data element position of the destination. In some embodiments a writemask is used to determine what should be stored in the destination operand. In some examples, the data elements are upscaled (e.g., to BF16, FP16, FP32, etc.) prior to the accumulation operation. Note upscaling may use a variable bias.

In some embodiments, the instruction is committed or retired at 311.

FIG. 4 illustrates examples of pseudocode representing the execution and format of an instruction to perform a dot product using FP8 values. Note that EVEX.b maps to the b of prefix 1101(C). The comment of DAZ, FTZ, RNE, and SAE refer to the use of support for flush-to-zero (FTZ), denormals-are-zero (DAZ), suppress all exceptions (SAE), and round-to-even (RNE) rounding.

These examples represent, in pseudocode form, operations of execution circuitry. The execution circuitry comprises combinational circuitry to perform these operations.

As illustrated, there is a helper function defined for the conversion from FP8 to FP32 ("convert_FP8_to_FP32"). Not that this conversion may be from BF8 or HF8. An example of a variant of this helper function is on that in a source value, an indication of the FP8 type, an indication of a bias value, and an indication of how NAN are to be treated.

Examples of the helper function are as follows (note FP8 is BF8 or HF8 and a bias term may be defined (not shown in the code of FIG. 4)):

```
convert_bf8_to_fp32( in, BF8, exp-bias, null )
    f32_bias = 0d127;
    bf8_bias = 0d15;
    s = ( in & 0x80 ) << 24; // sign
    e = ( in & 0x7c ) >> 2; // exponent
    f = ( in & 0x03 ); //* fraction */
    e_norm = e + (f32_bias - bf8_bias); // e+0x0111.0000
    res = { 0 };
/* convert subnormal denormal fp8 number into a normal fp32 number */
    Frc_width = 2;              // frc_width = 2 for BF8
    if ( (e == 0) && (f != 0) ) {
        // conditional return of 1 or lz_cnt
        lz_cnt = ( f > 0x1 ) ? 1 : Frc_width;
        e_norm = e_norm - lz_cnt + 1; // normalized exponent
        f = (f << lz_cnt) & 0x03; /* fixed it. Shift count == lz_cnt */
    }
/* zero */
else if ( (e == 0) && (f == 0) ) {
    e_norm = 0;
}
/* nan and inf */
else if ( e == 0x1f ) {
    e_norm = 0xff;
    f |= ( f == 0 ) ? 0 : 0x02; /* making first fraction bit 1. Bitwise OR */
}
/* set result to 0 */
res = 0x0;
/* set exp and fract */
res |= (e_norm << 23);
res |= (f << 21);
/* sign it */
res |= s;
return res; // return as floating point
convert_hf8_to_fp32( in, HF8, exp-bias, null )
    f32_bias = 0d127;
    hf8_bias = 0d7;
    s = ( in & 0x80 ) << 24;
    e = ( in & 0x78 ) >> 3;
    f = ( in & 0x07 );
    e_norm = e + (f32_bias - hf8_bias); // e+0d120
    res = { 0 };
    /* convert denormal hf8 number into a normal fp32 number */
```

-continued

```
Frc_width = 3;                    // frc_width = 3 for HF8
if ( (e == 0) && (f != 0) ) {
    lz_cnt = case (f)
        '1--:          1;
        '01-:          2;
        '001:          3;
    e_norm = e_norm - lz_cnt + 1;
    f = (f << (lz_cnt)) & 0x07;
}
else if ( (e == 0) && (f == 0) ) {
    e_norm = 0;
}
else if ( e == 0xf ) {
    e_norm = 0xff;
    f |= ( f == 0 ) ? 0 : 0x04; /* making first fraction bit 1.Bitwise OR */
}
/* set result to 0 */
res = 0x0;
/* set exp and fract */
res |= (e_norm << 23);
res |= (f << 20);
/* sign it */
res |= s;
return res;
```

Figure 5:
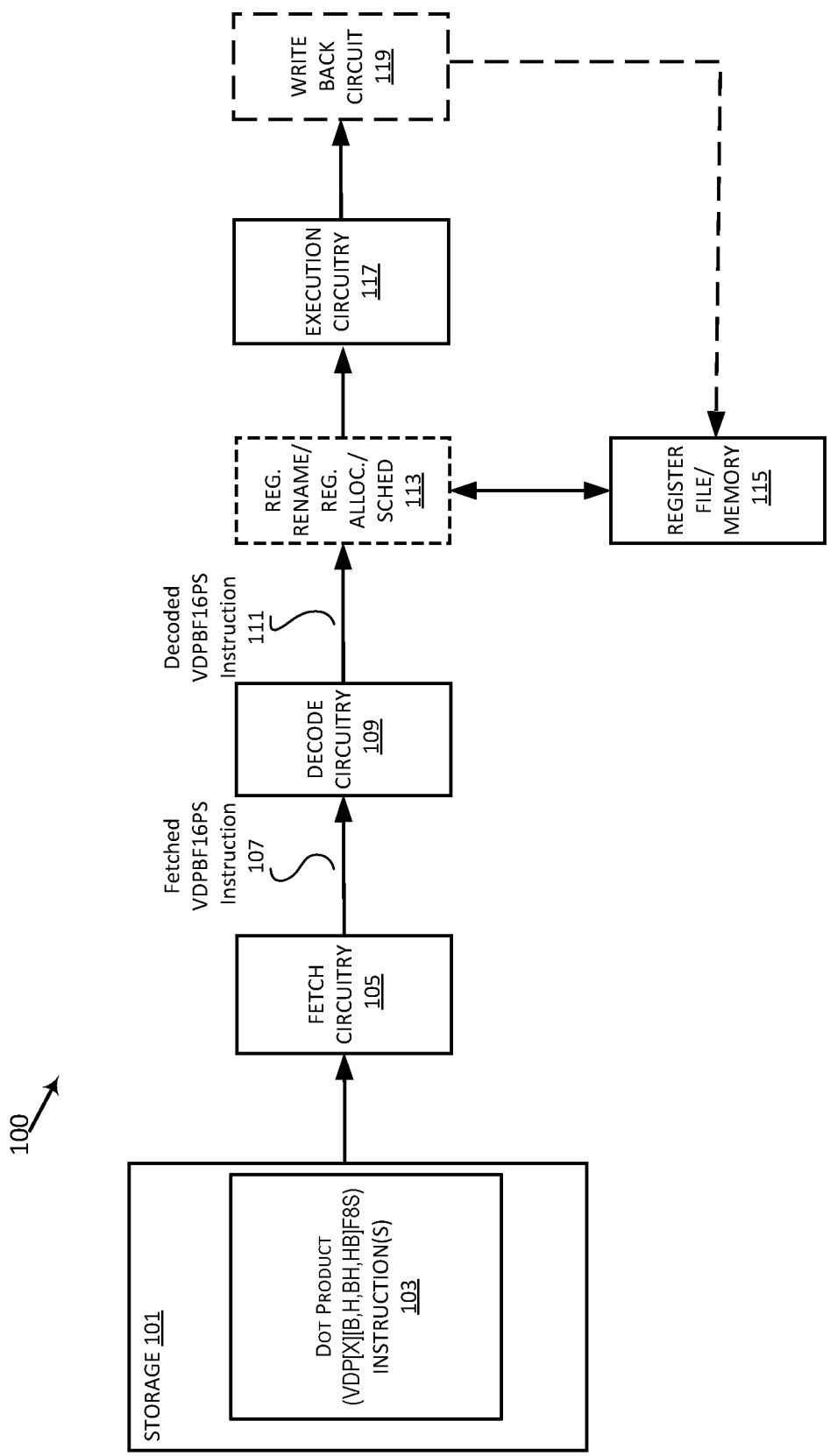
FIG. 5 illustrates embodiments of hardware to process an instruction such as the FP8 dot product instructions detailed above

FIG. 5 illustrates embodiments of hardware to process an instruction such as the FP8 dot product instructions detailed above. As illustrated, storage 1703 stores at least one VDP [X]BF8,HF8]PS instruction 1701 to be executed.

The instruction 1701 is received by decode circuitry 1705. For example, the decode circuitry 1705 receives this instruction from fetch logic/circuitry. The instruction includes fields for an opcode, first and second sources, and a destination. In some embodiments, the sources and destination are registers, and in other embodiments one or more are memory locations.

More detailed embodiments of at least one instruction format will be detailed later. The decode circuitry 1705 decodes the instruction into one or more operations. In some embodiments, this decoding includes generating a plurality of micro-operations to be performed by execution circuitry (such as execution circuitry 1709). The decode circuitry 1705 also decodes instruction prefixes.

In some embodiments, register renaming, register allocation, and/or scheduling circuitry 1707 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 1708 store data as operands of the instruction to be operated on by execution circuitry 1709. Exemplary register types include packed data registers, general purpose registers, and floating-point registers.

Execution circuitry 1709 executes the decoded instruction. Example detailed execution circuitry is described herein. The execution of the decoded instruction causes the execution circuitry to execute as detailed above.

In some embodiments, retirement/write back circuitry 1711 architecturally commits the result 1708 and retires the instruction.

The instruction(s) detailed above may be used in a variety of computer architectures and environments, utilize one or more instruction formats, etc. Examples of architectures, formats, etc. that support these instructions are detailed below.

Example Computer Architectures.

Detailed below are descriptions of example computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 6:
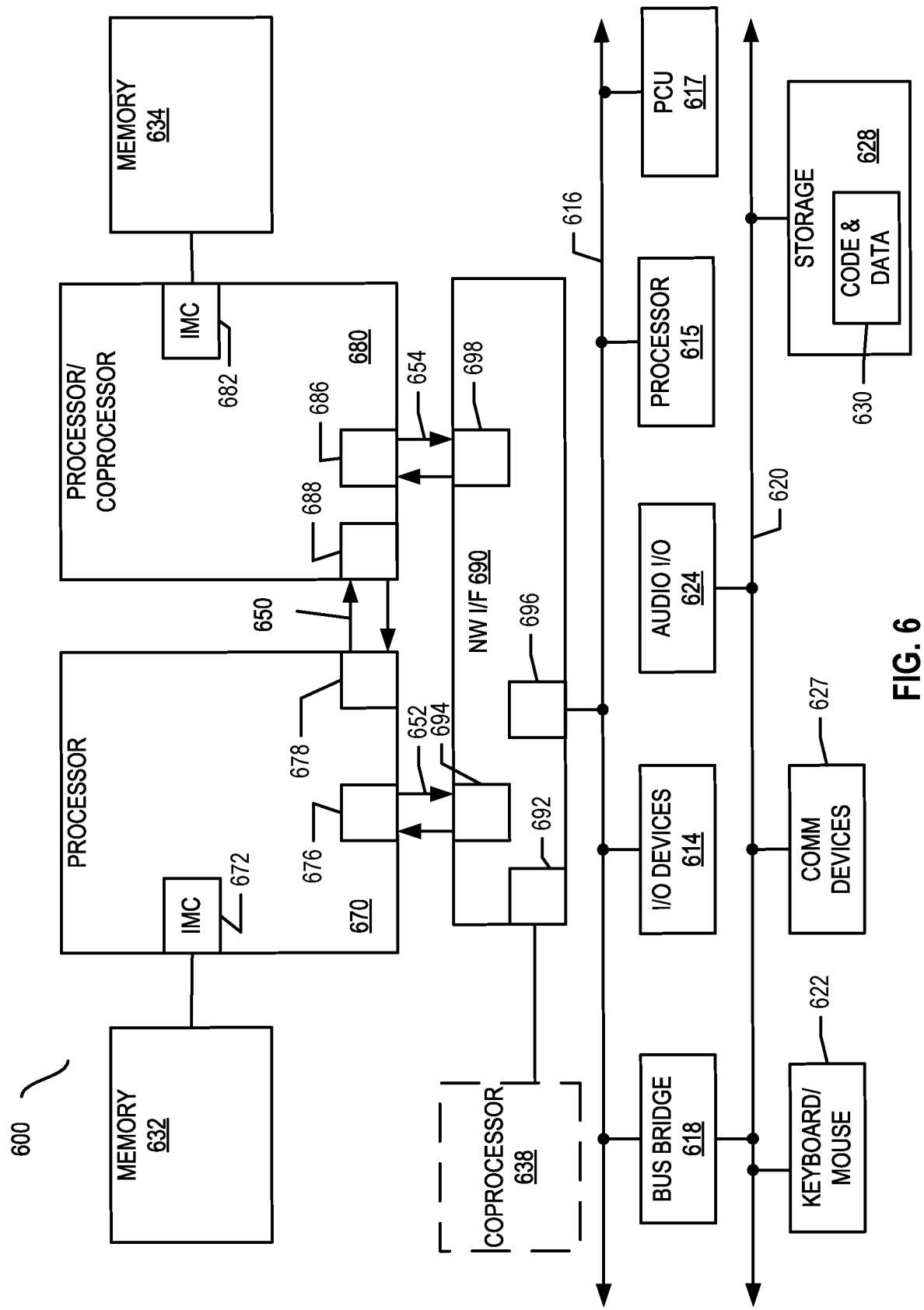
FIG. 6 illustrates an example computing system.

FIG. 6 illustrates an example computing system. Multiprocessor system 600 is an interfaced system and includes a plurality of processors or cores including a first processor 670 and a second processor 680 coupled via an interface 650 such as a point-to-point (P-P) interconnect, a fabric, and/or bus. In some examples, the first processor 670 and the second processor 680 are homogeneous. In some examples, first processor 670 and the second processor 680 are heterogenous. Though the example system 600 is shown to have two processors, the system may have three or more processors, or may be a single processor system. In some examples, the computing system is a system on a chip (SoC).

Processors 670 and 680 are shown including integrated memory controller (IMC) circuitry 672 and 682, respectively. Processor 670 also includes interface circuits 676 and 678; similarly, second processor 680 includes interface circuits 686 and 688. Processors 670, 680 may exchange information via the interface 650 using interface circuits 678, 688. IMCs 672 and 682 couple the processors 670, 680 to respective memories, namely a memory 632 and a memory 634, which may be portions of main memory locally attached to the respective processors.

Processors 670, 680 may each exchange information with a network interface (NW I/F) 690 via individual interfaces 652, 654 using interface circuits 676, 694, 686, 698. The network interface 690 (e.g., one or more of an interconnect, bus, and/or fabric, and in some examples is a chipset) may optionally exchange information with a coprocessor 638 via an interface circuit 692. In some examples, the coprocessor 638 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 670, 680 or outside of both processors, yet connected with the processors via an interface such as P-P interconnect, such that either or both processors' local cache information may be stored in the shared cache if a processor is placed into a low power mode.

Network interface 690 may be coupled to a first interface 616 via interface circuit 696. In some examples, first interface 616 may be an interface such as a Peripheral Component Interconnect (PCI) interconnect, a PCI Express interconnect or another I/O interconnect. In some examples, first interface 616 is coupled to a power control unit (PCU) 617, which may include circuitry, software, and/or firmware to perform power management operations with regard to the processors 670, 680 and/or co-processor 638. PCU 617 provides control information to a voltage regulator (not shown) to cause the voltage regulator to generate the appropriate regulated voltage. PCU 617 also provides control information to control the operating voltage generated. In various examples, PCU 617 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 617 is illustrated as being present as logic separate from the processor 670 and/or processor 680. In other cases, PCU 617 may execute on a given one or more of cores (not shown) of processor 670 or 680. In some cases, PCU 617 may be implemented as a microcontroller (dedicated or general-purpose) or other control logic configured to execute its own dedicated power management code, sometimes referred to as P-code. In yet other examples, power management operations to be performed by PCU 617 may be implemented externally to a processor, such as by way of a separate power management integrated circuit (PMIC) or another component external to the processor. In yet other examples, power management operations to be performed by PCU 617 may be implemented within BIOS or other system software.

Various I/O devices 614 may be coupled to first interface 616, along with a bus bridge 618 which couples first interface 616 to a second interface 620. In some examples, one or more additional processor(s) 615, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interface 616. In some examples, second interface 620 may be a low pin count (LPC) interface. Various devices may be coupled to second interface 620 including, for example, a keyboard and/or mouse 622, communication devices 627 and storage circuitry 628. Storage circuitry 628 may be one or more non-transitory machine-readable storage media as described below, such as a disk drive or other mass storage device which may include instructions/code and data 630 and may implement the storage 'ISAB03 in some examples. Further, an audio I/O 624 may be coupled to second interface 620. Note that other architectures than the point-to-point architecture described above are possible. For example, instead of the point-to-point architecture, a system such as multiprocessor system 600 may implement a multi-drop interface or other such architecture.

Example Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may be included on the same die as the described CPU (sometimes referred to as the application core(s) or application processor(s)), the above described coprocessor, and additional functionality. Example core architectures are described next, followed by descriptions of example processors and computer architectures.

Figure 7:
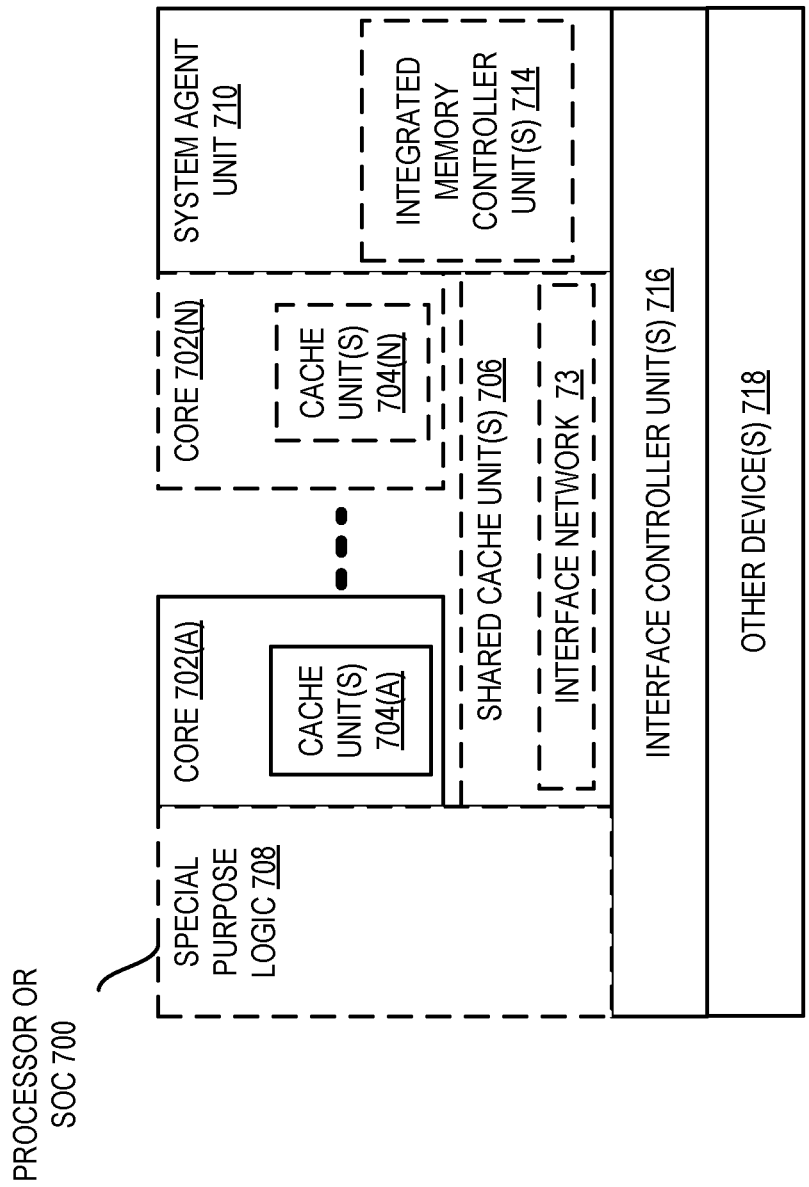
FIG. 7 illustrates a block diagram of an example processor and/or System on a Chip (SoC) that may have one or more cores and an integrated memory controller.

FIG. 7 illustrates a block diagram of an example processor and/or SoC 700 that may have one or more cores and an integrated memory controller. The solid lined boxes illustrate a processor 700 with a single core 702(A), system agent unit circuitry 710, and a set of one or more interface controller unit(s) circuitry 716, while the optional addition of the dashed lined boxes illustrates an alternative processor 700 with multiple cores 702(A)-(N), a set of one or more integrated memory controller unit(s) circuitry 714 in the system agent unit circuitry 710, and special purpose logic 708, as well as a set of one or more interface controller units circuitry 716. Note that the processor 700 may be one of the processors 670 or 680, or co-processor 638 or 615 of FIG. 6.

Thus, different implementations of the processor 700 may include: 1) a CPU with the special purpose logic 708 being integrated graphics and/or scientific (throughput) logic (which may include one or more cores, not shown), and the cores 702(A)-(N) being one or more general purpose cores (e.g., general purpose in-order cores, general purpose out-of-order cores, or a combination of the two); 2) a coprocessor with the cores 702(A)-(N) being a large number of special purpose cores intended primarily for graphics and/or scientific (throughput); and 3) a coprocessor with the cores 702(A)-(N) being a large number of general purpose in-order cores. Thus, the processor 700 may be a general-purpose processor, coprocessor or special-purpose processor, such as, for example, a network or communication processor, compression engine, graphics processor, GPGPU (general purpose graphics processing unit), a high throughput many integrated core (MIC) coprocessor (including 30 or more cores), embedded processor, or the like. The processor may be implemented on one or more chips. The processor 700 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 704(A)-(N) within the cores 702(A)-(N), a set of one or more shared cache unit(s) circuitry 706, and external memory (not shown) coupled to the set of integrated memory controller unit(s) circuitry 714. The set of one or more shared cache unit(s) circuitry 706 may include one or more mid-level caches, such as level 2 (L2), level 3 (L3), level 4 (L4), or other levels of cache, such as a last level cache (LLC), and/or combinations thereof. While in some examples interface network circuitry 712 (e.g., a ring interconnect) interfaces the special purpose logic 708 (e.g., integrated graphics logic), the set of shared cache unit(s) circuitry 706, and the system agent unit circuitry 710, alternative examples use any number of well-known techniques for interfacing such units. In some examples, coherency is maintained between one or more of the shared cache unit(s) circuitry 706 and cores 702(A)-(N). In some examples, interface controller units circuitry 716 couple the cores 702 to one or more other devices 718 such as one or more I/O devices, storage, one or more communication devices (e.g., wireless networking, wired networking, etc.), etc.

In some examples, one or more of the cores 702(A)-(N) are capable of multi-threading. The system agent unit circuitry 710 includes those components coordinating and operating cores 702(A)-(N). The system agent unit circuitry 710 may include, for example, power control unit (PCU) circuitry and/or display unit circuitry (not shown). The PCU may be or may include logic and components needed for regulating the power state of the cores 702(A)-(N) and/or the special purpose logic 708 (e.g., integrated graphics logic). The display unit circuitry is for driving one or more externally connected displays.

The cores 702(A)-(N) may be homogenous in terms of instruction set architecture (ISA). Alternatively, the cores 702(A)-(N) may be heterogeneous in terms of ISA; that is, a subset of the cores 702(A)-(N) may be capable of executing an ISA, while other cores may be capable of executing only a subset of that ISA or another ISA.

Example Core Architectures—In-Order and Out-of-Order Core Block Diagram.

Figure 8A:
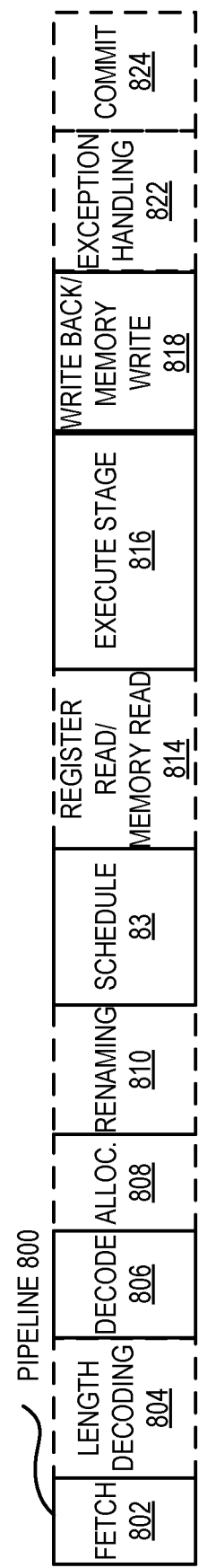
FIG. 8(A) is a block diagram illustrating both an example in-order pipeline and an example register renaming, out-of-order issue/execution pipeline according to examples.
Figure 8B:
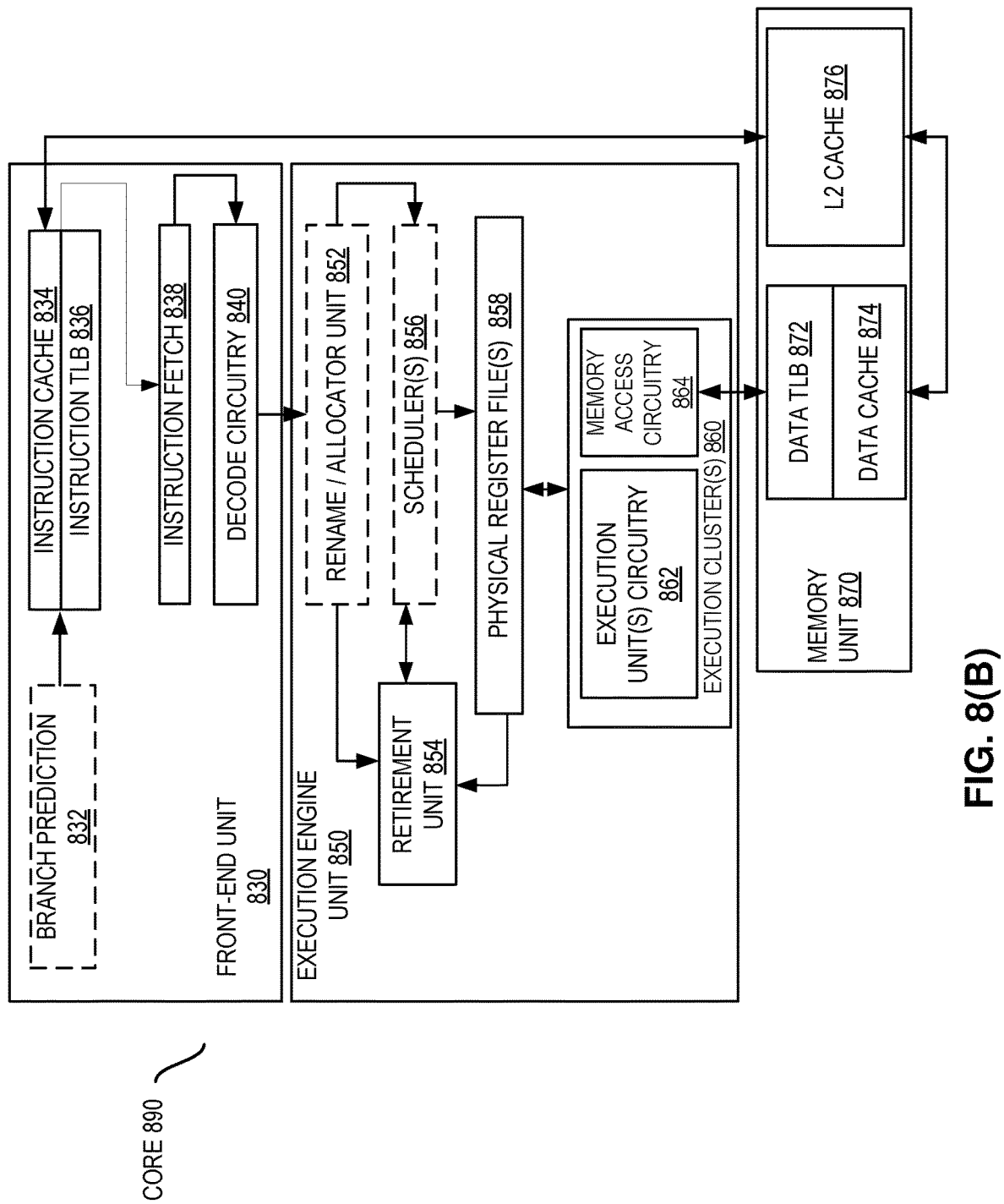
FIG. 8(B) is a block diagram illustrating both an example in-order architecture core and an example register renaming, out-of-order issue/execution architecture core to be included in a processor according to examples.

FIG. 8(A) is a block diagram illustrating both an example in-order pipeline and an example register renaming, out-of-order issue/execution pipeline according to examples. FIG. 8(B) is a block diagram illustrating both an example in-order architecture core and an example register renaming, out-of-order issue/execution architecture core to be included in a processor according to examples. The solid lined boxes in FIGS. 8(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8(A), a processor pipeline 800 includes a fetch stage 802, an optional length decoding stage 804, a decode stage 806, an optional allocation (Alloc) stage 808, an optional renaming stage 810, a schedule (also known as a dispatch or issue) stage 812, an optional register read/memory read stage 814, an execute stage 816, a write back/memory write stage 818, an optional exception handling stage 822, and an optional commit stage 824. One or more operations can be performed in each of these processor pipeline stages. For example, during the fetch stage 802, one or more instructions are fetched from instruction memory, and during the decode stage 806, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 806 and the register read/memory read stage 814 may be combined into one pipeline stage. In one example, during the execute stage 816, the decoded instructions may be executed, LSU address/data pipelining to an Advanced Microcontroller Bus (AMB) interface may be performed, multiply and add operations may be performed, arithmetic operations with branch results may be performed, etc.

By way of example, the example register renaming, out-of-order issue/execution architecture core of FIG. 8(B) may implement the pipeline 800 as follows: 1) the instruction fetch circuitry 838 performs the fetch and length decoding stages 802 and 804; 2) the decode circuitry 840 performs the decode stage 806; 3) the rename/allocator unit circuitry 852 performs the allocation stage 808 and renaming stage 810; 4) the scheduler(s) circuitry 856 performs the schedule stage 812; 5) the physical register file(s) circuitry 858 and the memory unit circuitry 870 perform the register read/memory read stage 814; the execution cluster(s) 860 perform the execute stage 816; 6) the memory unit circuitry 870 and the physical register file(s) circuitry 858 perform the write back/memory write stage 818; 7) various circuitry may be involved in the exception handling stage 822; and 8) the retirement unit circuitry 854 and the physical register file(s) circuitry 858 perform the commit stage 824.

FIG. 8(B) shows a processor core 890 including front-end unit circuitry 830 coupled to execution engine unit circuitry 850, and both are coupled to memory unit circuitry 870. The core 890 may be a reduced instruction set architecture computing (RISC) core, a complex instruction set architecture computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front-end unit circuitry 830 may include branch prediction circuitry 832 coupled to instruction cache circuitry 834, which is coupled to an instruction translation lookaside buffer (TLB) 836, which is coupled to instruction fetch circuitry 838, which is coupled to decode circuitry 840. In one example, the instruction cache circuitry 834 is included in the memory unit circuitry 870 rather than the front-end circuitry 830. The decode circuitry 840 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 840 may further include address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 840 may be implemented using various different mechanisms. Examples of suitable mechanisms include, but are not limited to, look-up tables, hardware implementations, programmable logic arrays (PLAs), microcode read only memories (ROMs), etc. In one example, the core 890 includes a microcode ROM (not shown) or other medium that stores microcode for certain macroinstructions (e.g., in decode circuitry 840 or otherwise within the front-end circuitry 830). In one example, the decode circuitry 840 includes a micro-operation (micro-op) or operation cache (not shown) to hold/cache decoded operations, micro-tags, or micro-operations generated during the decode or other stages of the processor pipeline 800. The decode circuitry 840 may be coupled to rename/allocator unit circuitry 852 in the execution engine circuitry 850.

The execution engine circuitry 850 includes the rename/allocator unit circuitry 852 coupled to retirement unit circuitry 854 and a set of one or more scheduler(s) circuitry 856. The scheduler(s) circuitry 856 represents any number of different schedulers, including reservations stations, central instruction window, etc. In some examples, the scheduler(s) circuitry 856 can include arithmetic logic unit (ALU) scheduler/scheduling circuitry, ALU queues, address generation unit (AGU) scheduler/scheduling circuitry, AGU queues, etc. The scheduler(s) circuitry 856 is coupled to the physical register file(s) circuitry 858. Each of the physical register file(s) circuitry 858 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 858 includes vector registers unit circuitry, writemask registers unit circuitry, and scalar register unit circuitry. These register units may provide architectural vector registers, vector mask registers, general-purpose registers, etc. The physical register file(s) circuitry 858 is coupled to the retirement unit circuitry 854 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 854 and the physical register file(s) circuitry 858 are coupled to the execution cluster(s) 860. The execution cluster(s) 860 includes a set of one or more execution unit(s) circuitry 862 and a set of one or more memory access circuitry 864. The execution unit(s) circuitry 862 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 856, physical register file(s) circuitry 858, and execution cluster(s) 860 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 864). It should also be understood that where separate pipelines are used, one or more of these pipelines may be out-of-order issue/execution and the rest in-order.

In some examples, the execution engine unit circuitry 850 may perform load store unit (LSU) address/data pipelining to an Advanced Microcontroller Bus (AMB) interface (not shown), and address phase and writeback, data phase load, store, and branches.

The set of memory access circuitry 864 is coupled to the memory unit circuitry 870, which includes data TLB circuitry 872 coupled to data cache circuitry 874 coupled to level 2 (L2) cache circuitry 876. In one example, the memory access circuitry 864 may include load unit circuitry, store address unit circuitry, and store data unit circuitry, each of which is coupled to the data TLB circuitry 872 in the memory unit circuitry 870. The instruction cache circuitry 834 is further coupled to the level 2 (L2) cache circuitry 876 in the memory unit circuitry 870. In one example, the instruction cache 834 and the data cache 874 are combined into a single instruction and data cache (not shown) in L2 cache circuitry 876, level 3 (L3) cache circuitry (not shown), and/or main memory. The L2 cache circuitry 876 is coupled to one or more other levels of cache and eventually to a main memory.

The core 890 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 890 includes logic to support a packed data instruction set architecture extension (e.g., AVX1, AVX2), thereby allowing the operations used by many multimedia applications to be performed using packed data.

Example Execution Unit(s) Circuitry.

Figure 9:
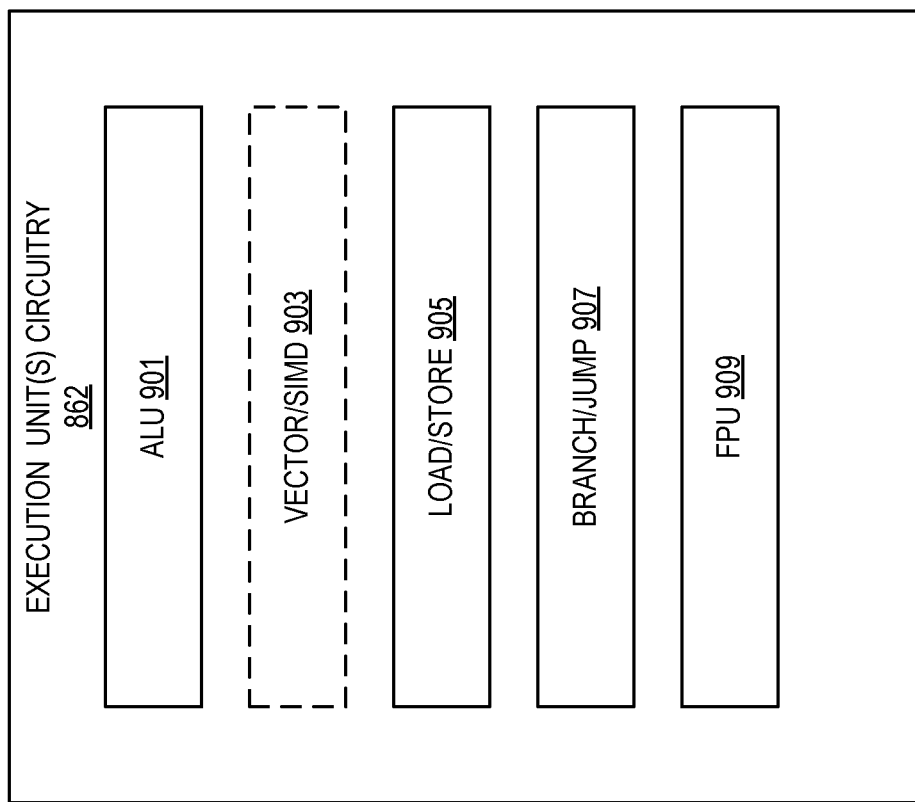
FIG. 9 illustrates examples of execution unit(s) circuitry.

FIG. 9 illustrates examples of execution unit(s) circuitry, such as execution unit(s) circuitry 862 of FIG. 8(B). As illustrated, execution unit(s) circuitry 862 may include one or more ALU circuits 901, optional vector/single instruction multiple data (SIMD) circuits 903, load/store circuits 905, branch/jump circuits 907, and/or Floating-point unit (FPU) circuits 909. ALU circuits 901 perform integer arithmetic and/or Boolean operations. Vector/SIMD circuits 903 perform vector/SIMD operations on packed data (such as SIMD/vector registers). Load/store circuits 905 execute load and store instructions to load data from memory into registers or store from registers to memory. Load/store circuits 905 may also generate addresses. Branch/jump circuits 907 cause a branch or jump to a memory address depending on the instruction. FPU circuits 909 perform floating-point arithmetic. The width of the execution unit(s) circuitry 862 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Example Register Architecture.

Figure 10:
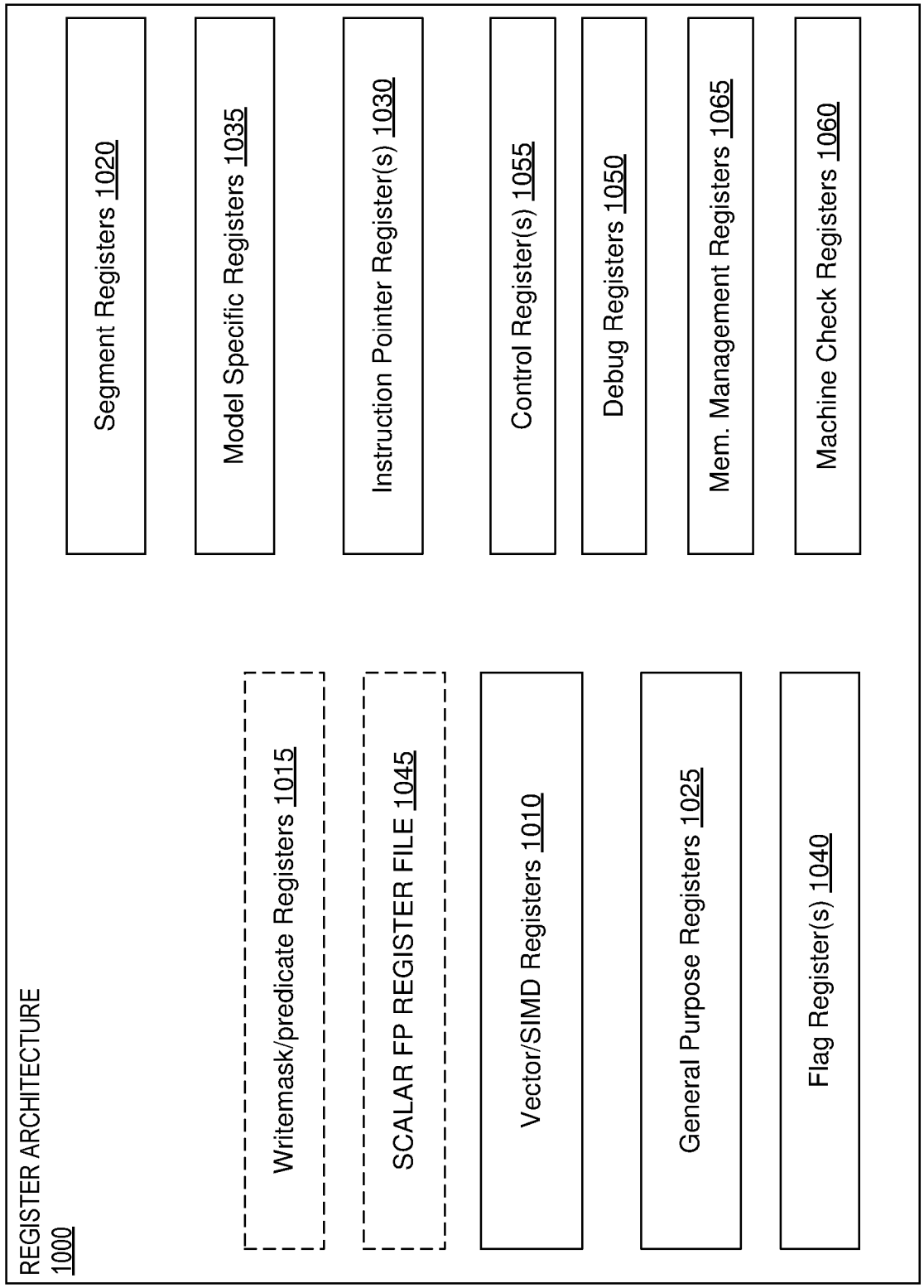
FIG. 10 is a block diagram of a register architecture according to some examples.

FIG. 10 is a block diagram of a register architecture 1000 according to some examples. As illustrated, the register architecture 1000 includes vector/SIMD registers 1010 that vary from 128-bit to 1,024 bits width. In some examples, the vector/SIMD registers 1010 are physically 512-bits and, depending upon the mapping, only some of the lower bits are used. For example, in some examples, the vector/SIMD registers 1010 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1000 includes writemask/predicate registers 1015. For example, in some examples, there are 8 writemask/predicate registers (sometimes called k0 through k7) that are each 16-bit, 32-bit, 64-bit, or 128-bit in size. Writemask/predicate registers 1015 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1015 corresponds to a data element position of the destination. In other examples, the writemask/predicate registers 1015 are scalable and consists of a set number of enable bits for a given vector element (e.g., 8 enable bits per 64-bit vector element).

The register architecture 1000 includes a plurality of general-purpose registers 1025. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1000 includes scalar floating-point (FP) register file 1045 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1040 (e.g., EFLAGS, RFLAGS, etc.) store status and control information for arithmetic, compare, and system operations. For example, the one or more flag registers 1040 may store condition code information such as carry, parity, auxiliary carry, zero, sign, and overflow. In some examples, the one or more flag registers 1040 are called program status and control registers.

Segment registers 1020 contain segment points for use in accessing memory. In some examples, these registers are referenced by the names CS, DS, SS, ES, FS, and GS.

Model specific registers or machine specific registers (MSRs) 1035 control and report on processor performance. Most MSRs 1035 handle system-related functions and are not accessible to an application program. For example, MSRs may provide control for one or more of: performance-monitoring counters, debug extensions, memory type range registers, thermal and power management, instruction-specific support, and/or processor feature/mode support. Machine check registers 1060 consist of control, status, and error reporting MSRs that are used to detect and report on hardware errors. Control register(s) 1055 (e.g., CR0-CR4) determine the operating mode of a processor (e.g., processor 670, 680, 638, 615, and/or 700) and the characteristics of a currently executing task. In some examples, MSRs 1035 are a subset of control registers 1055.

One or more instruction pointer register(s) 1030 store an instruction pointer value. Debug registers 1050 control and allow for the monitoring of a processor or core's debugging operations.

Memory (mem) management registers 1065 specify the locations of data structures used in protected mode memory management. These registers may include a global descriptor table register (GDTR), interrupt descriptor table register (IDTR), task register, and a local descriptor table register (LDTR) register.

Alternative examples may use wider or narrower registers. Additionally, alternative examples may use more, less, or different register files and registers. The register architecture 1000 may, for example, be used in register file/memory 'ISAB08, or physical register file(s) circuitry 858.

Instruction Set Architectures.

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an example ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. In addition, though the description below is made in the context of x86 ISA, it is within the knowledge of one skilled in the art to apply the teachings of the present disclosure in another ISA.

Example Instruction Formats.

Examples of the instruction(s) described herein may be embodied in different formats. Additionally, example systems, architectures, and pipelines are detailed below. Examples of the instruction(s) may be executed on such systems, architectures, and pipelines, but are not limited to those detailed.

Figure 11:
FIG. 11 illustrates examples of an instruction format.

FIG. 11 illustrates examples of an instruction format. As illustrated, an instruction may include multiple components including, but not limited to, one or more fields for: one or more prefixes 1101, an opcode 1103, addressing information 1105 (e.g., register identifiers, memory addressing information, etc.), a displacement value 1107, and/or an immediate value 1109. Note that some instructions utilize some or all the fields of the format whereas others may only use the field for the opcode 1103. In some examples, the order illustrated is the order in which these fields are to be encoded, however, it should be appreciated that in other examples these fields may be encoded in a different order, combined, etc.

The prefix(es) field(s) 1101, when used, modifies an instruction. In some examples, one or more prefixes are used to repeat string instructions (e.g., 0xF0, 0xF3, etc.), to provide section overrides (e.g., 0x2E, 0x36, 0x3E, 0x26, 0x64, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1103 is used to at least partially define the operation to be performed upon a decoding of the instruction. In some examples, a primary opcode encoded in the opcode field 1103 is one, two, or three bytes in length. In other examples, a primary opcode can be a different length. An additional 3-bit opcode field is sometimes encoded in another field.

Figure 12:
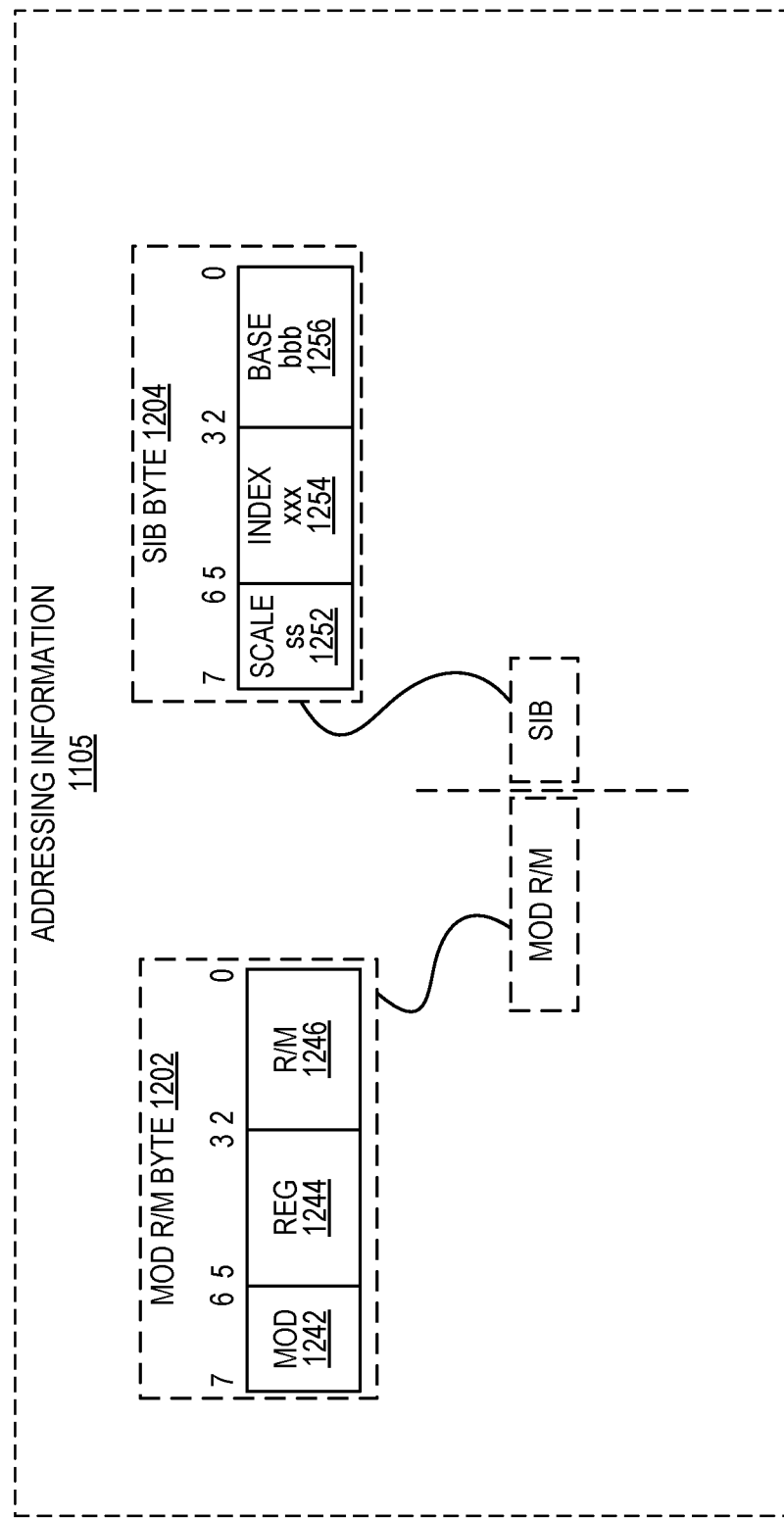
FIG. 12 illustrates examples of an addressing information field.

The addressing information field 1105 is used to address one or more operands of the instruction, such as a location in memory or one or more registers. FIG. 12 illustrates examples of the addressing information field 1105. In this illustration, an optional MOD R/M byte 1202 and an optional Scale, Index, Base (SIB) byte 1204 are shown. The MOD R/M byte 1202 and the SIB byte 1204 are used to encode up to two operands of an instruction, each of which is a direct register or effective memory address. Note that both of these fields are optional in that not all instructions include one or more of these fields. The MOD R/M byte 1202 includes a MOD field 1242, a register (reg) field 1244, and R/M field 1246.

The content of the MOD field 1242 distinguishes between memory access and non-memory access modes. In some examples, when the MOD field 1242 has a binary value of 11 (11b), a register-direct addressing mode is utilized, and otherwise a register-indirect addressing mode is used.

The register field 1244 may encode either the destination register operand or a source register operand or may encode an opcode extension and not be used to encode any instruction operand. The content of register field 1244, directly or through address generation, specifies the locations of a source or destination operand (either in a register or in memory). In some examples, the register field 1244 is supplemented with an additional bit from a prefix (e.g., prefix 1101) to allow for greater addressing.

The R/M field 1246 may be used to encode an instruction operand that references a memory address or may be used to encode either the destination register operand or a source register operand. Note the R/M field 1246 may be combined with the MOD field 1242 to dictate an addressing mode in some examples.

The SIB byte 1204 includes a scale field 1252, an index field 1254, and a base field 1256 to be used in the generation of an address. The scale field 1252 indicates a scaling factor. The index field 1254 specifies an index register to use. In some examples, the index field 1254 is supplemented with an additional bit from a prefix (e.g., prefix 1101) to allow for greater addressing. The base field 1256 specifies a base register to use. In some examples, the base field 1256 is supplemented with an additional bit from a prefix (e.g., prefix 1101) to allow for greater addressing. In practice, the content of the scale field 1252 allows for the scaling of the content of the index field 1254 for memory address generation (e.g., for address generation that uses $2^{scale}$*index+base).

Some addressing forms utilize a displacement value to generate a memory address. For example, a memory address may be generated according to $2^{scale}$*index+base+displacement, index*scale+displacement, r/m+displacement, instruction pointer (RIP/EIP)+displacement, register+displacement, etc. The displacement may be a 1-byte, 2-byte, 4-byte, etc. value. In some examples, the displacement field 1107 provides this value. Additionally, in some examples, a displacement factor usage is encoded in the MOD field of the addressing information field 1105 that indicates a compressed displacement scheme for which a displacement value is calculated and stored in the displacement field 1107.

In some examples, the immediate value field 1109 specifies an immediate value for the instruction. An immediate value may be encoded as a 1-byte value, a 2-byte value, a 4-byte value, etc.

FIG. 13 illustrates examples of a first prefix 1101(A). In some examples, the first prefix 1101(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1101(A) may specify up to three registers using 3-bit fields depending on the format: 1) using the reg field 1244 and the R/M field 1246 of the MOD R/M byte 1202; 2) using the MOD R/M byte 1202 with the SIB byte 1204 including using the reg field 1244 and the base field 1256 and index field 1254; or 3) using the register field of an opcode.

In the first prefix 1101(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 1244 and MOD R/M R/M field 1246 alone can each only address 8 registers.

In the first prefix 1101(A), bit position 2 (R) may be an extension of the MOD R/M reg field 1244 and may be used to modify the MOD R/M reg field 1244 when that field encodes a general-purpose register, a 64-bit packed data register (e.g., a SSE register), or a control or debug register. R is ignored when MOD R/M byte 1202 specifies other registers or defines an extended opcode.

Bit position 1 (X) may modify the SIB byte index field 1254.

Bit position 0 (B) may modify the base in the MOD R/M R/M field 1246 or the SIB byte base field 1256; or it may modify the opcode register field used for accessing general purpose registers (e.g., general purpose registers 1025).

FIGS. 14(A)-(D) illustrate examples of how the R, X, and B fields of the first prefix 1101(A) are used. FIG. 14(A) illustrates R and B from the first prefix 1101(A) being used to extend the reg field 1244 and R/M field 1246 of the MOD R/M byte 1202 when the SIB byte 1204 is not used for memory addressing. FIG. 14(B) illustrates R and B from the first prefix 1101(A) being used to extend the reg field 1244 and R/M field 1246 of the MOD R/M byte 1202 when the SIB byte 1204 is not used (register-register addressing). FIG. 14(C) illustrates R, X, and B from the first prefix 1101(A) being used to extend the reg field 1244 of the MOD R/M byte 1202 and the index field 1254 and base field 1256 when the SIB byte 1204 being used for memory addressing. FIG. 14(D) illustrates B from the first prefix 1101(A) being used to extend the reg field 1244 of the MOD R/M byte 1202 when a register is encoded in the opcode 1103.

FIGS. 15(A)-(B) illustrate examples of a second prefix 1101(B). In some examples, the second prefix 1101(B) is an example of a VEX prefix. The second prefix 1101(B) encoding allows instructions to have more than two operands, and allows SIMD vector registers (e.g., vector/SIMD registers 1010) to be longer than 64-bits (e.g., 128-bit and 256-bit). The use of the second prefix 1101(B) provides for three-operand (or more) syntax. For example, previous two-operand instructions performed operations such as A=A+B, which overwrites a source operand. The use of the second prefix 1101(B) enables operands to perform nondestructive operations such as A=B+C.

In some examples, the second prefix 1101(B) comes in two forms—a two-byte form and a three-byte form. The two-byte second prefix 1101(B) is used mainly for 128-bit, scalar, and some 256-bit instructions; while the three-byte second prefix 1101(B) provides a compact replacement of the first prefix 1101(A) and 3-byte opcode instructions.

FIG. 15(A) illustrates examples of a two-byte form of the second prefix 1101(B). In one example, a format field 1501 (byte 0 1503) contains the value C5H. In one example, byte 1 1505 includes an "R" value in bit[7]. This value is the complement of the "R" value of the first prefix 1101(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the MOD R/M R/M field 1246 to encode the instruction operand that references a memory address or encode either the destination register operand or a source register operand.

Instructions that use this prefix may use the MOD R/M reg field 1244 to encode either the destination register operand or a source register operand, or to be treated as an opcode extension and not used to encode any instruction operand.

For instruction syntax that support four operands, vvvv, the MOD R/M R/M field 1246 and the MOD R/M reg field 1244 encode three of the four operands. Bits[7:4] of the immediate value field 1109 are then used to encode the third source register operand.

FIG. 15(B) illustrates examples of a three-byte form of the second prefix 1101(B). In one example, a format field 1511 (byte 0 1513) contains the value C4H. Byte 1 1515 includes in bits[7:5]"R," "X," and "B" which are the complements of the same values of the first prefix 1101(A). Bits[4:0] of byte 1 1515 (shown as mmmmm) include content to encode, as need, one or more implied leading opcode bytes. For example, 00001 implies a 0FH leading opcode, 00010 implies a 0F38H leading opcode, 00011 implies a 0F3AH leading opcode, etc.

Bit[7] of byte 2 1517 is used similar to W of the first prefix 1101(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the MOD R/M R/M field 1246 to encode the instruction operand that references a memory address or encode either the destination register operand or a source register operand.

Instructions that use this prefix may use the MOD R/M reg field 1244 to encode either the destination register operand or a source register operand, or to be treated as an opcode extension and not used to encode any instruction operand.

For instruction syntax that support four operands, vvvv, the MOD R/M R/M field 1246, and the MOD R/M reg field 1244 encode three of the four operands. Bits[7:4] of the immediate value field 1109 are then used to encode the third source register operand.

Figure 16:
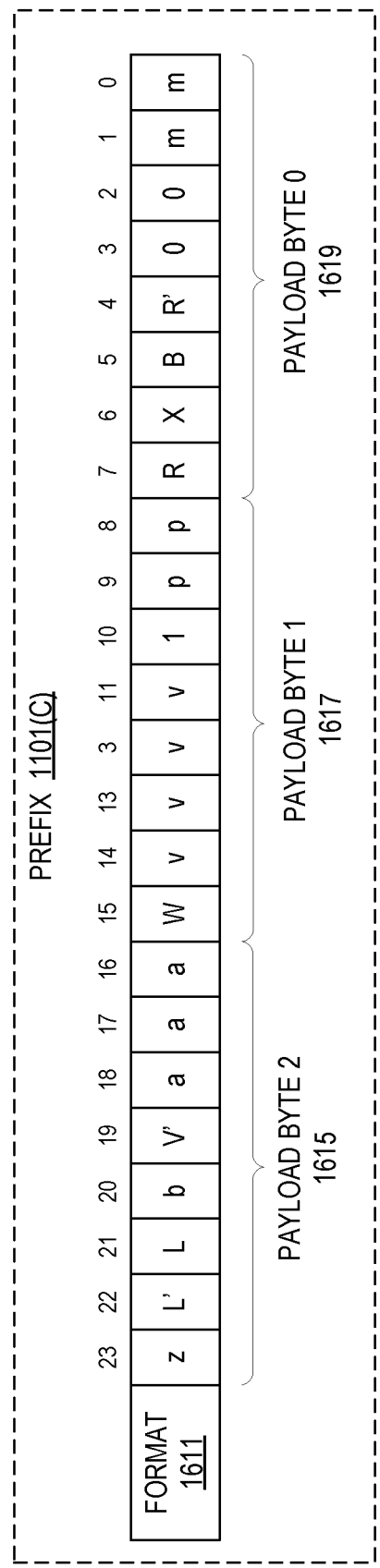
FIG. 16 illustrates examples of a third prefix.

FIG. 16 illustrates examples of a third prefix 1101(C). In some examples, the third prefix 1101(C) is an example of an EVEX prefix. The third prefix 1101(C) is a four-byte prefix.

The third prefix 1101(C) can encode 32 vector registers (e.g., 128-bit, 256-bit, and 512-bit registers) in 64-bit mode.

In some examples, instructions that utilize a writemask/opmask (see discussion of registers in a previous figure, such as FIG. 10) or predication utilize this prefix. Opmask register allow for conditional processing or selection control. Opmask instructions, whose source/destination operands are opmask registers and treat the content of an opmask register as a single value, are encoded using the second prefix 1101(B).

The third prefix 1101(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1101(C) is a format field 1611 that has a value, in one example, of 62H. Subsequent bytes are referred to as payload bytes 1615-1619 and collectively form a 24-bit value of P[23:0] providing specific capability in the form of one or more fields (detailed herein).

In some examples, P[1:0] of payload byte 1619 are identical to the low two mm bits. P[3:2] are reserved in some examples. Bit P[4] (R') allows access to the high 16 vector register set when combined with P[7] and the MOD R/M reg field 1244. P[6] can also provide access to a high 16 vector register when SIB-type addressing is not needed. P[7:5] consist of R, X, and B which are operand specifier modifier bits for vector register, general purpose register, memory addressing and allow access to the next set of 8 registers beyond the low 8 registers when combined with the MOD R/M register field 1244 and MOD R/M R/M field 1246. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 1101(A) and second prefix 1111(B) and may serve as an opcode extension bit or operand size promotion.

P[18:16] specify the index of a register in the opmask (writemask) registers (e.g., writemask/predicate registers 1015). In one example, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22: 21]). P[23] indicates support for merging-writemasking (e.g., when set to 0) or support for zeroing and merging-writemasking (e.g., when set to 1).

Example examples of encoding of registers in instructions using the third prefix 1101(C) are detailed in the following tables.

TABLE 1

32-Register Support in 64-bit Mode

| | 4 | 3 | [2:0] | REG. TYPE | COMMON USAGES |
|---|---|---|---|---|---|
| REG | R' | R | Mod R/M reg | GPR, Vector | Destination or Source |
| VVVV | V' | | vvvv | GPR, Vector | 2nd Source or Destination |
| RM | X | B | Mod R/M R/M | GPR, Vector | 1st Source or Destination |
| BASE | 0 | B | Mod R/M R/M | GPR | Memory addressing |
| INDEX | 0 | X | SIB.index | GPR | Memory addressing |
| VIDX | V' | X | SIB.index | Vector | VSIB memory addressing |

TABLE 2

Encoding Register Specifiers in 32-bit Mode

| | [2:0] | REG. TYPE | COMMON USAGES |
|---|---|---|---|
| REG | Mod R/M reg | GPR, Vector | Destination or Source |
| VVVV | vvvv | GPR, Vector | $2^{nd}$ Source or Destination |
| RM | Mod R/M R/M | GPR, Vector | $1^{st}$ Source or Destination |
| BASE | Mod R/M R/M | GPR | Memory addressing |
| INDEX | SIB.index | GPR | Memory addressing |
| VIDX | SIB.index | Vector | VSIB memory addressing |

TABLE 3

Opmask Register Specifier Encoding

| | [2:0] | REG. TYPE | COMMON USAGES |
|---|---|---|---|
| REG | Mod R/M Reg | k0-k7 | Source |
| VVVV | vvvv | k0-k7 | $2^{nd}$ Source |
| RM | Mod R/M R/M | k0-k7 | $1^{st}$ Source |
| {k1} | aaa | k0-k7 | Opmask |

Program code may be applied to input information to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), a field programmable gate array (FPGA), a microprocessor, or any combination thereof.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "intellectual property (IP) cores" may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products. Emulation (Including Binary Translation, Code Morphing, Etc.).

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
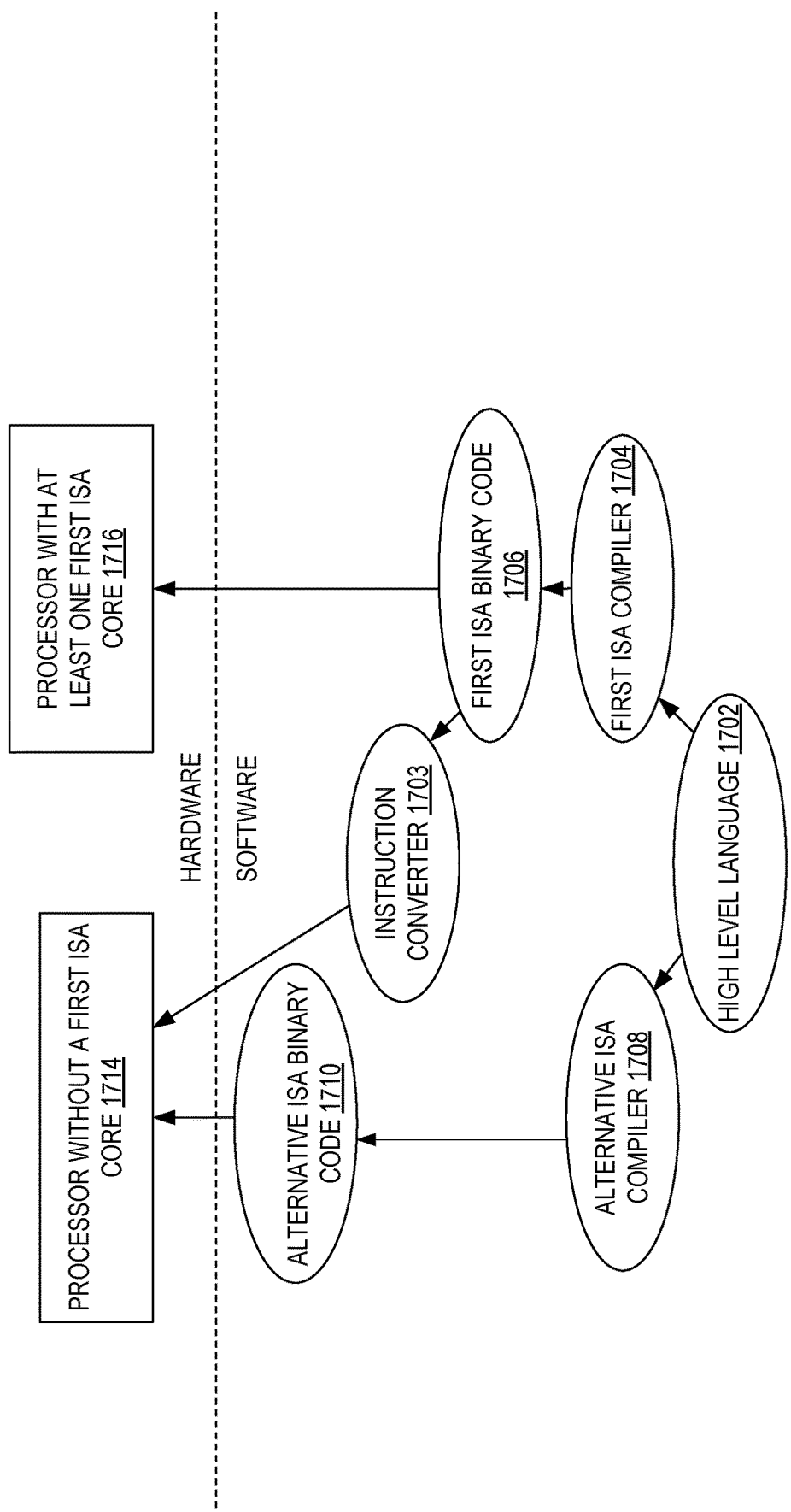
FIG. 17 is a block diagram illustrating the use of a software instruction converter to convert binary instructions in a source instruction set architecture to binary instructions in a target instruction set architecture according to examples.

FIG. 17 is a block diagram illustrating the use of a software instruction converter to convert binary instructions in a source ISA to binary instructions in a target ISA according to examples. In the illustrated example, the instruction converter is a software instruction converter, although alternatively the instruction converter may be implemented in software, firmware, hardware, or various combinations thereof. FIG. 17 shows a program in a high-level language 1702 may be compiled using a first ISA compiler 1704 to generate first ISA binary code 1706 that may be natively executed by a processor with at least one first ISA core 1716. The processor with at least one first ISA core 1716 represents any processor that can perform substantially the same functions as an Intel® processor with at least one first ISA core by compatibly executing or otherwise processing (1) a substantial portion of the first ISA or (2) object code versions of applications or other software targeted to run on an Intel processor with at least one first ISA core, in order to achieve substantially the same result as a processor with at least one first ISA core. The first ISA compiler 1704 represents a compiler that is operable to generate first ISA binary code 1706 (e.g., object code) that can, with or without additional linkage processing, be executed on the processor with at least one first ISA core 1716. Similarly, FIG. 17 shows the program in the high-level language 1702 may be compiled using an alternative ISA compiler 1708 to generate alternative ISA binary code 1710 that may be natively executed by a processor without a first ISA core 1714. The instruction converter 1712 is used to convert the first ISA binary code 1706 into code that may be natively executed by the processor without a first ISA core 1714. This converted code is not necessarily to be the same as the alternative ISA binary code 1710; however, the converted code will accomplish the general operation and be made up of instructions from the alternative ISA. Thus, the instruction converter 1712 represents software, firmware, hardware, or a combination thereof that, through emulation, simulation or any other process, allows a processor or other electronic device that does not have a first ISA processor or core to execute the first ISA binary code 1706.

Exemplary embodiments include, but are not limited to:

1. A processor comprising:
    fetch circuitry to fetch an instruction having fields to specify an opcode and locations of first source, second source, and destination vectors, the opcode to indicate execution circuitry is to multiply pairs of 8-bit floating-point formatted elements of the specified first and second sources, and accumulate the resulting products with previous contents of a corresponding single-precision element of the specified destination;
    decode circuitry to decode the fetched instruction; and
    execution circuitry to respond to the decoded instruction as specified by the opcode.
2. The processor of example 1, wherein the locations of each of the specified source and destination vectors are either in registers or in memory.
3. The processor of example 1, wherein the 8-bit floating-point format comprises a sign bit, a 5-bit exponent, and a 2-bit fraction.
4. The processor of example 1, wherein the 8-bit floating-point format comprises a sign bit, a 4-bit exponent, and a 3-bit fraction.
5. The processor of example 1, wherein the execution circuitry is to perform the multiplications with infinite precision without saturation and to saturate the result of the accumulation to plus or minus infinity in case of an overflow and to zero in case of any underflow.
6. The processor of example 1, wherein the 8-bit floating-point format data is to be upscaled to FP32 prior to the multiplication.
7. The processor of example 1, wherein the execution circuitry is to generate all N elements of the specified destination in parallel.
8. A method comprising:
    fetching, using fetch circuitry, an instruction having fields to specify an opcode and locations of first source, second source, and destination vectors, the opcode to indicate execution circuitry is to multiply pairs of 8-bit floating-point formatted elements of the specified first and second sources, and accumulate the resulting products with previous contents of a corresponding single-precision element of the specified destination;
    decoding, using decode circuitry, the fetched instruction; and
    responding to the decoded instruction as specified by the opcode with execution circuitry.
9. The method of example 8, wherein the locations of each of the specified source and destination vectors are either in registers or in memory.
10. The method of example 8, wherein the 8-bit floating-point format comprises a sign bit, a exponent, and a 2-bit fraction.
11. The method of example 8, wherein the 8-bit floating-point format comprises a sign bit, a 4-bit exponent, and a 3-bit fraction.
12. The method of example 8, wherein the execution circuitry is to perform the multiplications with infinite precision without saturation and to saturate the result of the accumulation to plus or minus infinity in case of an overflow and to zero in case of any underflow.
13. The method of example 8, wherein the 8-bit floating-point format data is to be upscaled to FP32 prior to the multiplication.
14. The method of example 8, wherein the execution circuitry is to generate all N elements of the specified destination in parallel.
15. A system comprising a memory and a processor, the memory to store an instance of an instruction; and
processor comprising:
    fetch circuitry to fetch the instance of the instruction having fields to specify an opcode and locations of first source, second source, and destination vectors, the opcode to indicate execution circuitry is to multiply pairs of 8-bit floating-point formatted elements of the specified first and second sources, and accumulate the resulting products with previous contents of a corresponding single-precision element of the specified destination;
    decode circuitry to decode the fetched instruction; and
    execution circuitry to respond to the decoded instruction as specified by the opcode.
16. The system of example 15, wherein the locations of each of the specified source and destination vectors are either in registers in the processor or in the memory.
17. The system of example 15, wherein the 8-bit floating-point format comprises a sign bit, a 4-bit exponent, and a 3-bit fraction.
18. The system of example 15, wherein the 8-bit floating-point format comprises a sign bit, a exponent, and a 2-bit fraction.
19. The processor of example 1, wherein the first source is to store data elements of the 8-bit floating-point format comprising a sign bit, a 5-bit exponent, and a 2-bit fraction and the second source is to store data elements of the 8-bit floating-point format comprising a sign bit, a 4-bit exponent, and a 3-bit fraction.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (i.e. A and B, A and C, B and C, and A, B and C).

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A processor comprising:
   decode circuitry to decode an instruction having a first field to specify a first vector register, a second field to specify a second vector register, and a third field to specify a third vector register, the first vector register to store a first source vector including a first plurality of 8-bit floating-point data elements, the second vector register to store a second source vector including a second plurality of 8-bit floating-point data elements, each of the first plurality of 8-bit floating-point data elements corresponding to a different one of the second plurality of 8-bit floating-point data elements, the third vector register to store a third source vector including a plurality of 32-bit single-precision floating-point data elements, each of the 32-bit single-precision floating-point data elements corresponding to four pairs of corresponding 8-bit floating-point data elements of the first and second source vectors; and
   execution circuitry coupled with the decode circuitry, the execution circuitry to perform operations corresponding to the instruction, including to:
      generate a plurality of 32-bit single-precision floating-point data elements, each of the 32-bit single-precision floating-point data elements based on a sum of four products of four pairs of corresponding 8-bit floating-point data elements of the first and second source vectors; and
      accumulate each of the plurality of 32-bit single-precision floating-point data elements with a corresponding one of the plurality of 32-bit single-precision floating-point data elements of the third source vector.

2. The processor of claim 1, wherein an 8-bit floating-point data element of the first plurality of 8-bit floating-point data elements is to have a sign bit, a 5-bit exponent, and a 2-bit fraction.

3. The processor of claim 1, wherein an 8-bit floating-point data element of the first plurality of 8-bit floating-point data elements is to have a sign bit, a 4-bit exponent, and a 3-bit fraction.

4. The processor of claim 1, wherein an 8-bit floating-point data element of the first plurality of 8-bit floating-point data elements is to have a sign bit, a 5-bit exponent, and a 2-bit fraction, and wherein an 8-bit floating-point data element of the second plurality of 8-bit floating-point data elements is to have a sign bit, a 4-bit exponent, and a 3-bit fraction.

5. The processor of claim 1, wherein the first plurality of 8-bit floating-point data elements are to have a first format and the second plurality of 8-bit floating-point data elements are to have a second, different format.

6. The processor of claim 1, wherein the first and second source vectors have a same size selected from a group consisting of 128-bits, 256-bits, 512-bits, and 1024-bits.

7. The processor of claim 1, wherein an 8-bit floating-point data element of the first plurality of 8-bit floating-point data elements is to have a sign bit, a 5-bit exponent, and a 2-bit fraction, and wherein an 8-bit floating-point data element of the second plurality of 8-bit floating-point data elements is to have a sign bit, a 4-bit exponent, and a 3-bit fraction, and wherein the first and second source vectors have a same size selected from a group consisting of 128-bits, 256-bits, 512-bits, and 1024-bits.

8. The processor of claim 1, wherein the first plurality of 8-bit floating-point data elements are to have a first format and the second plurality of 8-bit floating-point data elements are to have a second, different format, and wherein the first and second source vectors have a same size selected from a group consisting of 128-bits, 256-bits, 512-bits, and 1024-bits.

9. A method comprising:
   decoding an instruction having a first field specifying a first vector register, a second field specifying a second vector register, and a third field specifying a third vector register, the first vector register storing a first source vector including a first plurality of 8-bit floating-point data elements, the second vector register storing a second source vector including a second plurality of 8-bit floating-point data elements, each of the first plurality of 8-bit floating-point data elements corresponding to a different one of the second plurality of 8-bit floating-point data elements, the third vector register storing a third source vector including a plurality of 32-bit single-precision floating-point data elements, each of the 32-bit single-precision floating-point data elements corresponding to four pairs of corresponding 8-bit floating-point data elements of the first and second source vectors; and
   performing operations corresponding to the instruction, including:
      generating a plurality of 32-bit single-precision floating-point data elements, each of the 32-bit single-precision floating-point data elements based on a sum of four products of four pairs of corresponding 8-bit floating-point data elements of the first and second source vectors; and
      accumulating each of the plurality of 32-bit single-precision floating-point data elements with a corresponding one of the plurality of 32-bit single-precision floating-point data elements of the third source vector.

10. The method of claim 9, wherein an 8-bit floating-point data element of the first plurality of 8-bit floating-point data elements has a sign bit, a 5-bit exponent, and a 2-bit fraction.

11. The method of claim 9, wherein an 8-bit floating-point data element of the first plurality of 8-bit floating-point data elements has a sign bit, a 4-bit exponent, and a 3-bit fraction.

12. The method of claim 9, wherein an 8-bit floating-point data element of the first plurality of 8-bit floating-point data elements has a sign bit, a 5-bit exponent, and a 2-bit fraction, and wherein an 8-bit floating-point data element of the second plurality of 8-bit floating-point data elements has a sign bit, a 4-bit exponent, and a 3-bit fraction.

13. The method of claim 9, wherein the first plurality of 8-bit floating-point data elements have a first format and the second plurality of 8-bit floating-point data elements have a second, different format.

14. The method of claim 9, wherein the first and second source vectors have a same size selected from a group consisting of 128-bits, 256-bits, 512-bits, and 1024-bits.

15. A system comprising:
a system memory; and
a processor coupled with the system memory, the processor comprising:
  decode circuitry to decode an instruction having a first field to specify a first vector register, a second field to specify a second vector register, and a third field to specify a third vector register, the first vector register to store a first source vector including a first plurality of 8-bit floating-point data elements, the second vector register to store a second source vector including a second plurality of 8-bit floating-point data elements, each of the first plurality of 8-bit floating-point data elements corresponding to a different one of the second plurality of 8-bit floating-point data elements, the third vector register to store a third source vector including a plurality of 32-bit single-precision floating-point data elements, each of the 32-bit single-precision floating-point data elements corresponding to four pairs of corresponding 8-bit floating-point data elements of the first and second source vectors; and
  execution circuitry coupled with the decode circuitry, the execution circuitry to perform operations corresponding to the instruction, including to:
    generate a plurality of 32-bit single-precision floating-point data elements, each of the 32-bit single-precision floating-point data elements based on a sum of four products of four pairs of corresponding 8-bit floating-point data elements of the first and second source vectors; and
    accumulate each of the plurality of 32-bit single-precision floating-point data elements with a corresponding one of the plurality of 32-bit single-precision floating-point data elements of the third source vector.

16. The system of claim 15, wherein the system memory comprises a dynamic random-access memory (DRAM), and wherein an 8-bit floating-point data element of the first plurality of 8-bit floating-point data elements is to have a sign bit, a 5-bit exponent, and a 2-bit fraction.

17. The system of claim 15, further comprising a communication device coupled with the processor, and wherein an 8-bit floating-point data element of the first plurality of 8-bit floating-point data elements is to have a sign bit, a 4-bit exponent, and a 3-bit fraction.

18. The system of claim 15, further comprising a storage device coupled with the system memory, and wherein an 8-bit floating-point data element of the first plurality of 8-bit floating-point data elements is to have a sign bit, a 5-bit exponent, and a 2-bit fraction, and wherein an 8-bit floating-point data element of the second plurality of 8-bit floating-point data elements is to have a sign bit, a 4-bit exponent, and a 3-bit fraction.

19. The system of claim 15, further comprising a coprocessor coupled with the processor, and wherein the first plurality of 8-bit floating-point data elements are to have a first format and the second plurality of 8-bit floating-point data elements are to have a second, different format.

20. The system of claim 15, further comprising and input/output device coupled with the processor, and wherein the first and second source vectors have a same size selected from a group consisting of 128-bits, 256-bits, 512-bits, and 1024-bits.

* * * * *